MAGNETIC SHIMS

Filed Dec. 28, 1945 15 Sheets-Sheet 1

INVENTORS
J. ROBERT OPPENHEIMER
STANLEY PHILLIPS FRANKEL
ELDRED CARLYLE NELSON

BY Robert A. Lavender
ATTORNEY.

Oct. 4, 1955 J. R. OPPENHEIMER ET AL 2,719,924

MAGNETIC SHIMS

Filed Dec. 28, 1945 15 Sheets-Sheet 2

INVENTORS
J. ROBERT OPPENHEIMER
STANLEY PHILLIPS FRANKEL
ELDRED CARLYLE NELSON

BY Robert A. Lavender

ATTORNEY.

INVENTORS
J ROBERT OPPENHEIMER
STANLEY PHILLIPS FRANKEL
ELDRED CARLYLE NELSON
BY
Robert A Lavender Oct. 4, 1955 J. R. OPPENHEIMER ET AL 2,719,924

MAGNETIC SHIMS

Filed Dec. 28, 1945 15 Sheets-Sheet 4

INVENTORS
J. ROBERT OPPENHEIMER
STANLEY PHILLIPS FRANKEL
ELDRED CARLYLE NELSON
BY Robert A. Lavender
ATTORNEY.

INVENTORS
J. ROBERT OPPENHEIMER
STANLEY PHILLIPS FRANKEL
ELDRED CARLYLE NELSON
BY Robert A. Saunders
ATTORNEY.

MAGNETIC SHIMS

INVENTORS
J ROBERT OPPENHEIMER
STANLEY PHILLIPS FRANKEL
BY ELDRED CARLYLE NELSON

Robert A. Lavender

Oct. 4, 1955 J. R. OPPENHEIMER ET AL 2,719,924

MAGNETIC SHIMS

Filed Dec. 28, 1945 15 Sheets-Sheet 7

INVENTORS
J ROBERT OPPENHEIMER
STANLEY PHILLIPS FRANKEL
ELDRED CARLYLE NELSON

BY Robert A. Lavender

MAGNETIC SHIMS

Filed Dec. 28, 1945 15 Sheets-Sheet 8

INVENTORS
J. ROBERT OPPENHEIMER
STANLEY PHILLIPS FRANKEL
ELDRED CARLYLE NELSON
BY
Robert A. [signature]
ATTORNEY.

Oct. 4, 1955 J. R. OPPENHEIMER ET AL 2,719,924

MAGNETIC SHIMS

Filed Dec. 28, 1945 15 Sheets-Sheet 9

INVENTORS
J. ROBERT OPPENHEIMER
STANLEY PHILLIPS FRANKEL
ELDRED CARLYLE NELSON

BY Robert A. Lavender
ATTORNEY.

INVENTORS
J. ROBERT OPPENHEIMER
STANLEY PHILLIPS FRANKEL
ELDRED CARLYLE NELSON
BY Robert A. Lavender
ATTORNEY.

MAGNETIC SHIMS

Filed Dec. 28, 1945

INVENTORS
J ROBERT OPPENHEIMER
STANLEY PHILLIPS FRANKEL
ELDRED CARLYLE NELSON
BY
Robert A. Lavender
ATTORNEY.

INVENTORS
J. ROBERT OPPENHEIMER
STANLEY PHILLIPS FRANKEL
ELDRED CARLYLE NELSON
BY
Robert A. Lavender
ATTORNEY.

INVENTORS
J. ROBERT OPPENHEIMER
STANLEY PHILLIPS FRANKEL
ELDRED CARLYLE NELSON

BY Robert A. Lavender
ATTORNEY.

MAGNETIC SHIMS
Filed Dec. 28, 1945 15 Sheets-Sheet 14
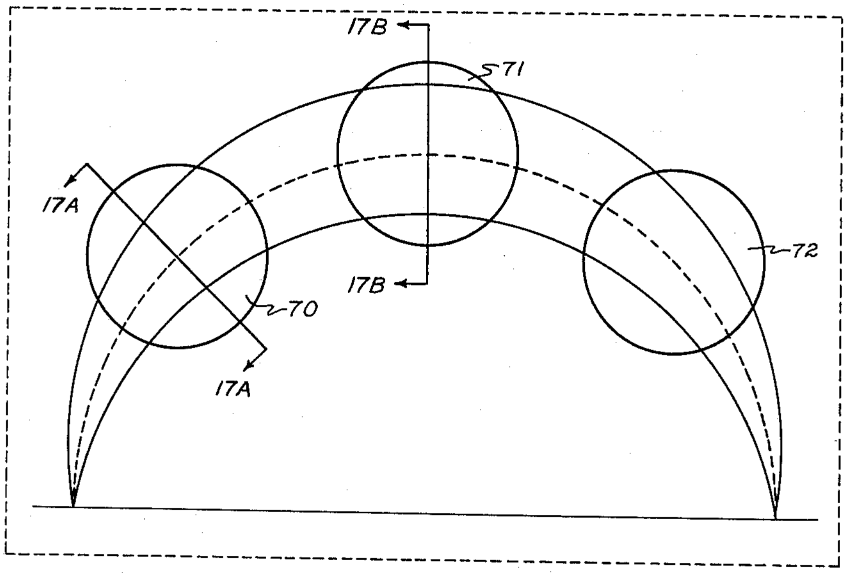
FIG. 17
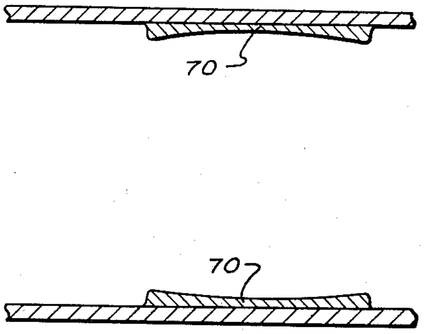
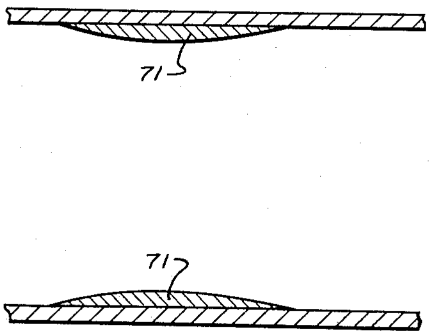
FIG. 17A FIG. 17B
INVENTORS
J ROBERT OPPENHEIMER
STANLEY PHILLIPS FRANKEL
BY ELDRED CARLYLE NELSON

INVENTORS
J ROBERT OPPENHEIMER
STANLEY PHILLIPS FRANKEL
BY ELDRED CARLYLE NELSON

Robert A Lavender

United States Patent Office 2,719,924

Patented Oct. 4, 1955

2,719,924

MAGNETIC SHIMS

J Robert Oppenheimer, Kensington Park, and Stanley Phillips Frankel, Los Angeles, Calif., and Eldred Carlyle Nelson, Los Alamos, N. Mex., assignors to the United States of America as represented by the United States Atomic Energy Commission Application December 28, 1945, Serial No. 637,690

6 Claims. (Cl. 250—41.9)

This invention relates to improvements in the electromagnetic separation of ionized particles of different masses, and is specifically directed to improvements in the novel mass-spectro-separator, sometimes referred to as a Calutron, as illustrated and described in E. O. Lawrence, application Serial No. 557,784, filed October 9, 1944. This type of apparatus is for separating particles of two different masses that are originally mixed. In the device of the Lawrence application, a beam of positive or negative ions or other charged particles is projected in a magnetic field in a direction sensibly perpendicular to the direction of the magnetic field. This magnetic field, prior to the present invention, has been insofar as possible, completely straight and of uniform intensity. Such a field will be referred to as "homogeneous."

To produce such a homogeneous field, the region used is enclosed between two parallel, plane surfaces of two masses of iron, steel, or other magnetizable material of sufficient thickness to ensure the uniform spread of magnetic potential over the said surfaces. The two planes bounding the region in which a homogeneous field is to be produced may be the pole faces of the magnet itself.

In such a homogeneous magnetic field, a charged particle initially projected at a relatively high velocity from a source in a direction perpendicular to the direction of the magnetic field will describe a circular orbit or trajectory in a plane perpendicular to the direction of the magnetic field, i. e., a plane parallel to the aforementioned plane boundaries of the region of homogeneous field.

The orbit whose diameter is the source collector line is hereinafter referred to as the "zero-angle" orbit or trajectory. Then it can easily be seen that other circles in this plane having the same radius and starting point (the "source") but which start in a direction making an angle $\alpha$ with the initial direction of the zero-angle orbit will meet this source-collector line at a distance from the source of $2R_0 \cos \alpha$, where $R_0$ is the common radius of the circles. Such circles will approach each other at the diametrical opposite point on the median circle from the source. This concentration is called the focus, and is usually selected as the target or collector (see Figure 2). If $\alpha$ is small, this distance is less than $2R_0$ by approximately $R_0\alpha^2$ (where $\alpha$ is measured in radians). Thus if a beam of ions of the same mass and energy, hence the same radius, is confined to an angular spread of $\pm\alpha$ (plus being toward the center of the zero angle orbit), the beam is brought to a focus of width $R_0\alpha^2$ along the aforementioned line. The greater the mass of a particle the greater is the diameter of the trajectory. Thus by confining the beam at the source to a suitably small angular spread the sharpness of the several focuses can be made sufficient to resolve two components differing slightly in mass. The components to be separated are best collected at their respective natural focuses. If the two components differ only slightly in mass, however, the permissible angular spread at the source will be correspondingly small, otherwise overlapping of the component beams and remixing thereof will occur.

An improved focus also makes the collection less sensitive to disturbances in the beam, giving therefore steadier operation of a separation process. It is disadvantageous to have to confine the beam to a narrow angular spread as much of the intensity of the beam is thereby lost and consequently the quantity of material separated per unit time, is reduced. (The desired improvements have been obtained however, in this invention by modifying the magnetic field.)

It is therefore an object of the invention to provide a method and means to increase the quantity of material which is separated into concentrated components without reducing the efficiency of the separation.

It is another object to improve material separating devices of the type described.

It is a further object of the invention to provide a method and means of improving the sharpness of focus of an ion beam in the mass spectroseparator.

It is a still further object of the invention to provide a method and means for efficiently separating components in a mass spectroseparator employing beams of relatively large angular spread.

It is a principal object of the invention to provide a magnetic field in an electromagnetic mass-spectroseparator which results in a beam envelope having a sharpness of focus of a desired component with a minimum of overlapping of an undesired component.

Other objects have been attained by the use of the illustrative embodiments (the operation of which is shown schematically) illustrated in the accompanying drawings made part of this specification in which:

Figures 17, 17A and 17B illustrate diagrammatically and in a partly broken cross-section the operation and contours of various types of spot shims.

Figure 1:
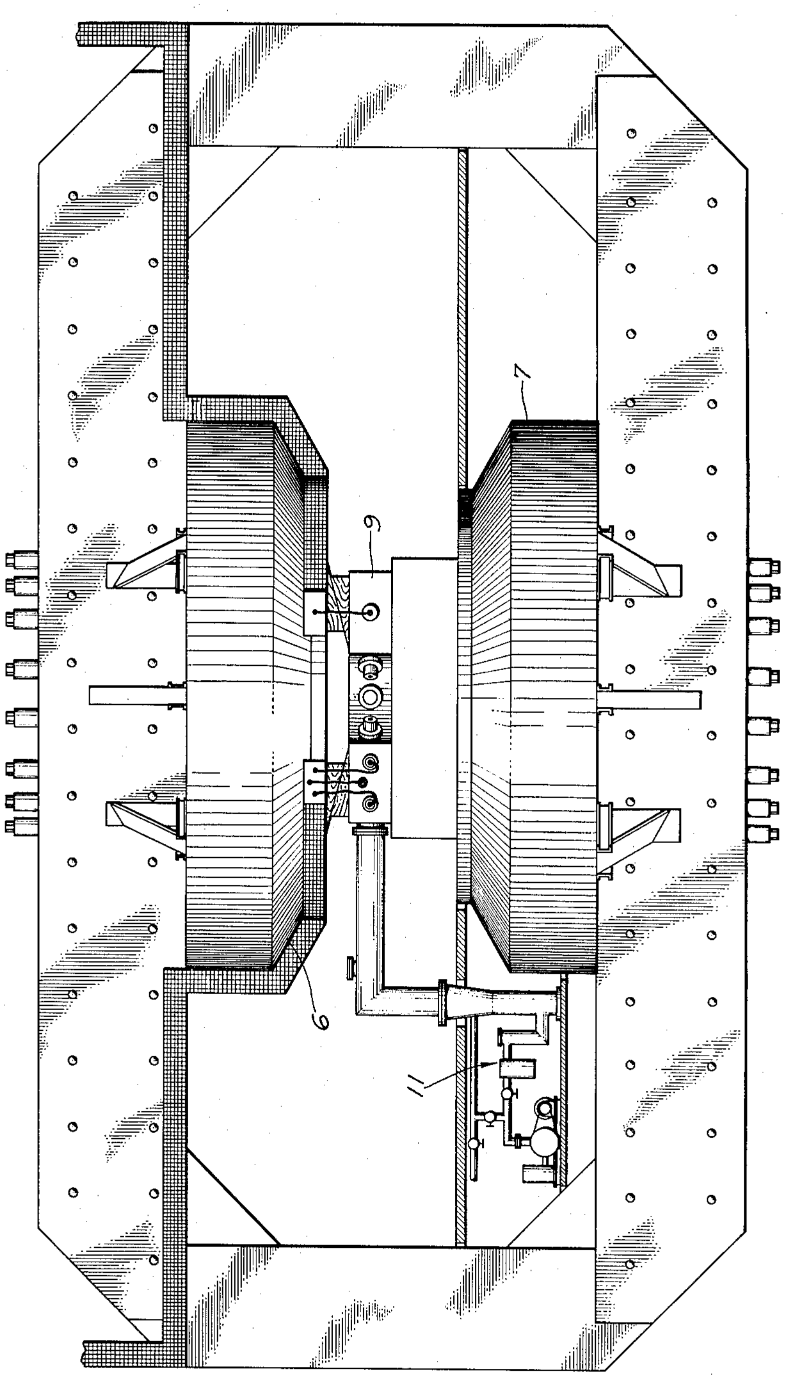
Figure 1 is a front elevation of a magnetic mass spectro-separator.
Figure 2:
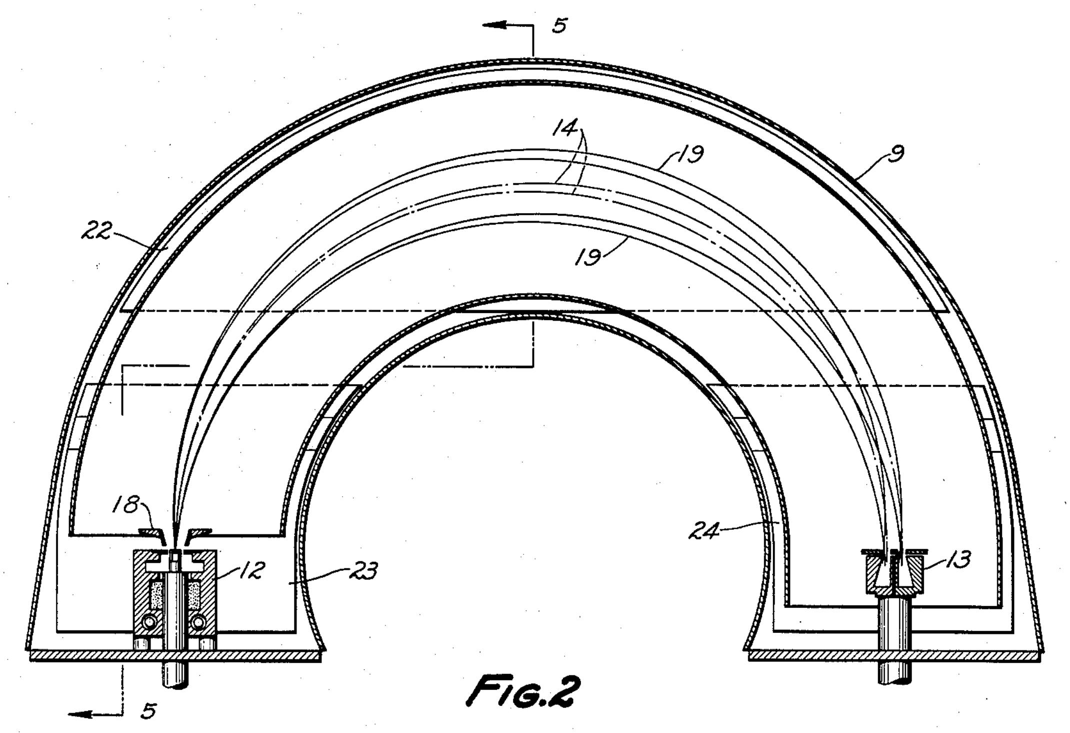
Figure 2 is a cross section on a median plane through the device in Figure 1 disclosing diagrammatically certain interior elements.
Figures 2A, 2B:
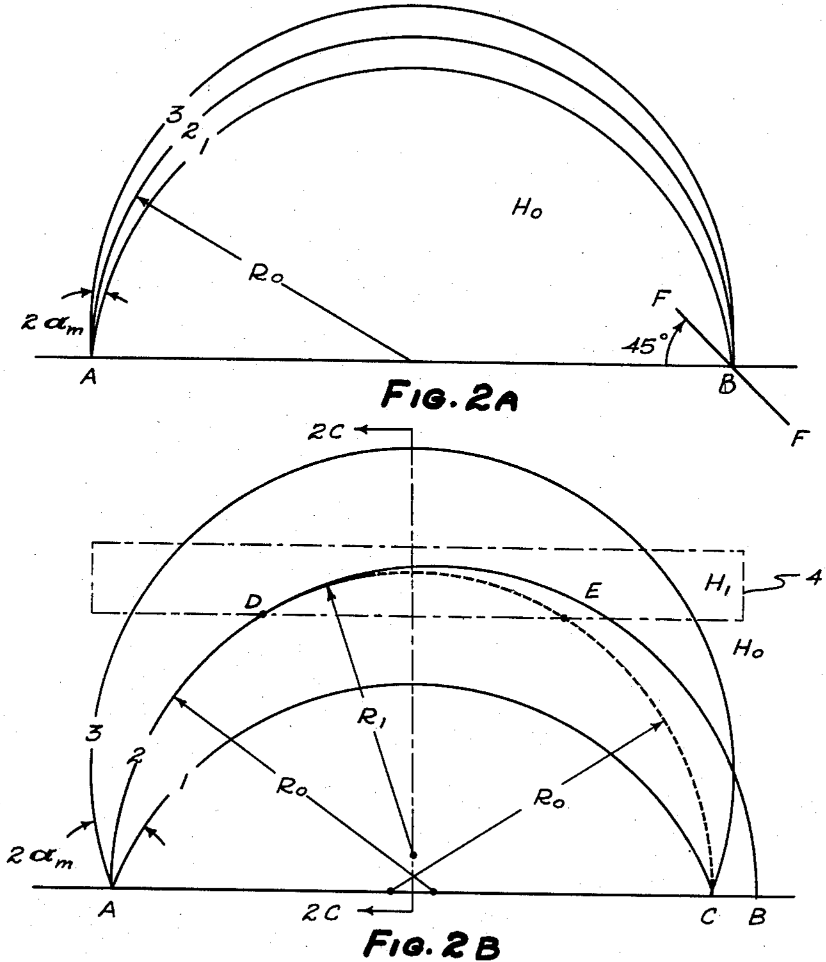
Figures 2A, 2B and 2C are schematic drawings illustrating the mode of operation of a separator of the type described under various magnetic field conditions.

The 180° focusing principle of the magnetic mass-separator is explained in Figure 2B, which shows certain paths of ions having the same mass to charge ratio in the median plane of the apparatus. The magnetic field is supposed uniform, of intensity $H_0$, at right angles to the plane of the drawing. The ion producing and accelerating mechanism, not shown, is located at point A, and the circular arcs represent the paths of certain ions, all having the same charge-to-mass ratio, leaving point A. The path designated by numeral 2 is the trajectory of an ion at the center of the beam, and paths 1 and 3 are paths of ions at the edges of the beam. When the angular divergence, $2\alpha_m$, of the beam is small, as shown in Figure 2A, all of the ion paths of the beam come very nearly into coincidence at point B, at which point an ion in path 2 has travelled through an arc of 180°, and ions in paths 1 and 3 have travelled through arcs that are slightly shorter and slightly longer, respectively, all these arcs having the same radius $R_0$ as fixed in well known fashion by the magnetic field intensity $H_0$.

When the total angular divergence of the beam is larger and the magnetic field is still uniform, of intensity $H_0$, the ion paths are as shown by the solid curves in Figure 2B, and it is seen that the three ion paths no longer come even approximately into coincidence; the central path passes through point B and paths 1 and 3 pass through point C, while other paths of the beam pass through points intermediate between B and C. In order to collect all these ions in a receiver, the entrance slot of the receiver would have to be so wide that ions of other mass-to-charge ratios would also enter the said slot (overlap), and the purpose of the apparatus would be largely defeated. In a device handling very large ion beam currents, as in the mass-separator under discussion, it is desirable, and usually unavoidable, that the beam have a large angular divergence, and it is therefore an object of the invention to provide means for narrowing or sharpening the focus B—C for beams of large angular divergence.

The chief basic principle of the invention is also explained by reference to Figure 2B, in which it is now supposed that within the rectangular area denoted by numeral 4, the magnetic field intensity has been increased from its value $H_0$ to a slightly greater value $H_1$. Ions in path 1 will not be affected by this change, and ions in path 3 will be only very slightly affected, because it passes very quickly through this rectangular area, whereas ions in path 2 spend a relatively long time in this area, and therein has its path altered to a circular arc of shorter radius $R_1$ as shown by the broken line curve DE. A suitable value of the field strength $H_1$ will cause the path of ions originally in path 2, to come into coincidence with paths 1 and 3 at point C in a manner somewhat as shown by the extension of line DE.

Other paths lying in the beam between 1 and 3 must of course also be considered. It is obvious that by an extension of the above principle all such paths can be made to coincide at point C in the two dimensional system of the median plane, if the magnetic field intensity is made to vary continuously in a suitable manner as function of the distance from the line AB as shown in greater detail later. This is equivalent to placing a large number of very narrow rectangles, of the sort shown, side by side and giving the field a suitable intensity in each. In each rectangle the ion paths have a radius of curvature determined by the magnetic field strength there and the complete paths can be found by geometrical construction or calculation. The variation of field strength required to make the paths coincide at point C can also be found by calculation. The field strength could also be made to vary along the lengths of the rectangles, but this is not necessary, and for reasons explained below in connection with multiple-source, multiple-receiver systems, it is preferred that the field strength be constant along each line parallel to AB.

Figure 2C:
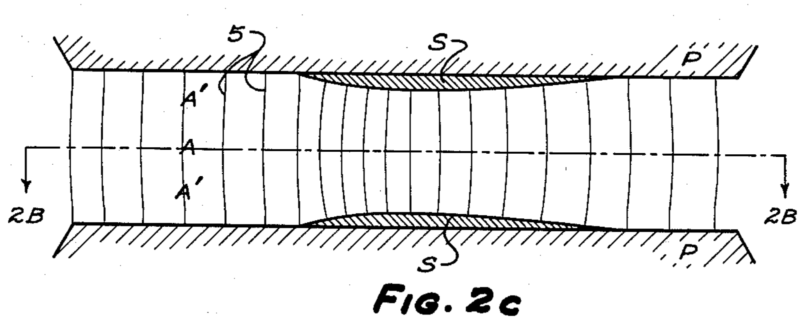
Figure 4:
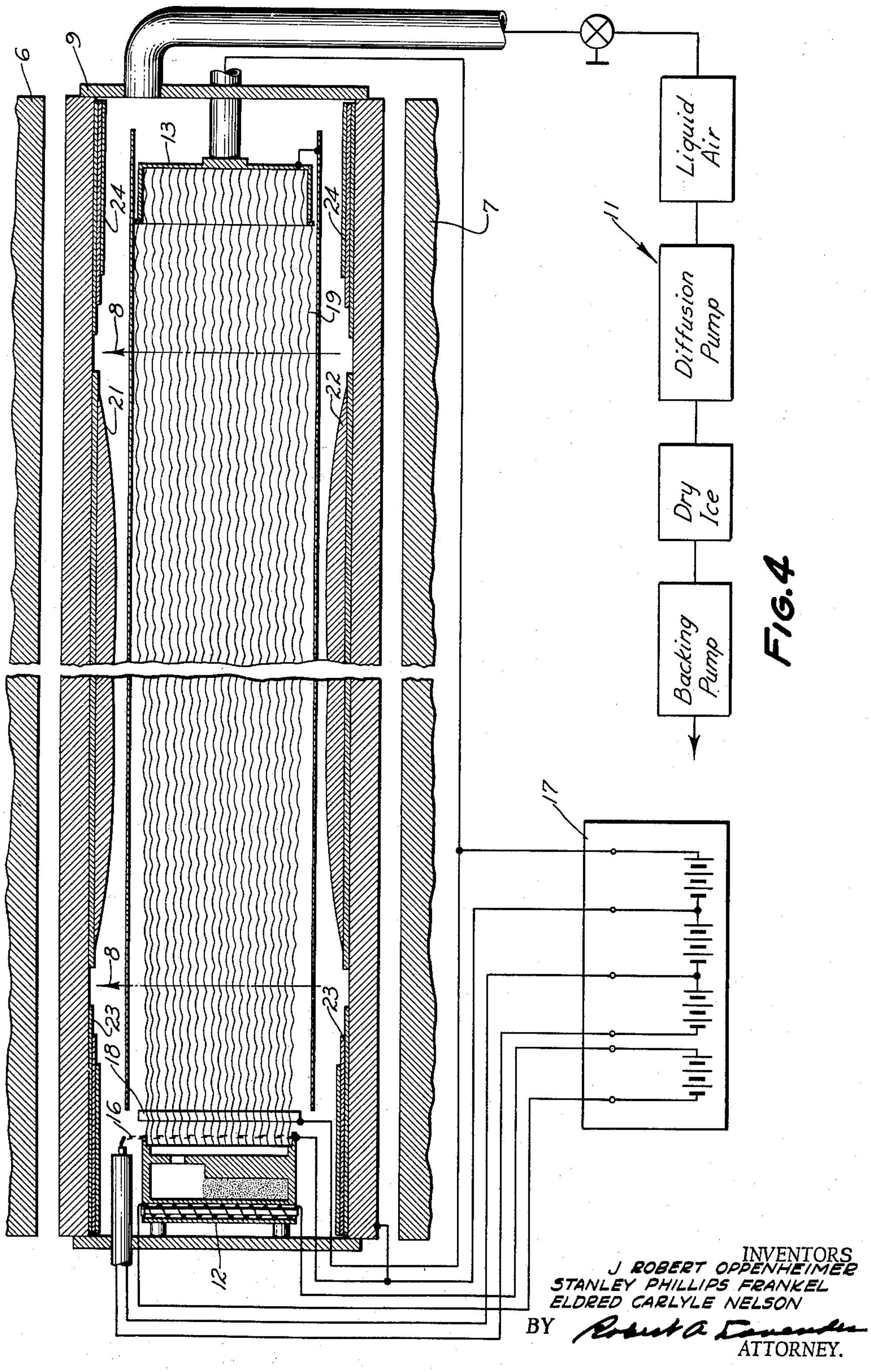
Figure 4 is a diagram of a separator on a plane developed along path 2 in Figure 2A, portions of the device being broken away to reduce the size of the figure.

Complications arise because of the three-dimensional nature of the ion beam. This is particularly true when large beam currents are used, because then the source has considerable extent along a line perpendicular to the plane of the drawings at point A, and it is necessary to consider ion paths above and below the median plane of the apparatus. Figure 2C is a schematic cross section view along the line 2C on Figure 2B. The letter P denotes the pole pieces of the electromagnet. S denotes the modification of the magnet to distort the magnetic field as shown by the lines of force 5. This is usually accomplished by using a device called "shims" comprising a plurality of plates of soft iron so shaped to accomplish the desired distortion of the magnetic field. The material of the shims is of such high magnetic permeability in comparison with air that the shim surfaces are very closely equipotential surfaces, and in the air gap the magnetic potential satisfies Laplace's equation. It follows, as is well known, that the field is strongest where the gap is narrowest, that the lines of force meet the shim surfaces at right angles, and that the lines of force are necessarily curved, if the field is to be non-uniform in any plane, such as the median plane of the apparatus. It follows that above and below the median plane the lines of force of the magnetic field have a small horizontal component (in the $y$ direction) and that the variation of the vertical component will be different from that in the median plane. The construction of the source (including the accelerating structure), designated by the line A'A' in Figure 2C, is usually such that the ions start out from it in horizontal directions—that is, directions lying in planes parallel to the median plane. But the trajectory of an ion generally is not confined to the plane in which it starts, because the force acting on a charged particle is at right angles to the lines of force of the field as well as to the direction of motion of the particle, and the force consequently has an upward or downward component at various points along the trajectory; this has the result that ions generally reach the receiver at a different height, above or below the median plane, from that at which they start.

The projection of the ion path on the median plane is determined, in the first approximation, by the vertical component of the field, and, as noted above, this component is different in the various planes parallel to the median plane. Two ions that start out from the source in such a way as to be one directly over the other, that is, two ions originating from different points of the source line A'A', but both having the same angle of divergence, in their respective planes, from the center of the beam—do not remain in this relationship; when they arrive at the receiver, one is generally farther away from the source than the other. This has an important consequence that no possible magnetic field can make all the ions of the beam pass through a line parallel to the source—for example perpendicular to the median plane at point C in Figure 2B—even though this result would be desirable from the point of view of simplicity of construction of the ion receiver. The fundamental laws of magnetic fields are such that they impose restrictions on the beam patterns obtainable. The second (and principal) object of the invention is to provide a magnetic field that results in an acceptable pattern (one that minimizes overlapping of the patterns of two different isotopes) in spite of these restrictions.

Ability to achieve this object rests on two phenomena or relationships that were discovered by mathematical analysis and later verified experimentally. To explain them, the concept of the image of the source A'A' is introduced. This is simply the cross-section of the ion beam or the beam envelope, at the place near the receiver where the beam is narrowest. There is an image for each isotope. If the magnetic field is homogeneous, these images are straight "lines" (considerably broadened) lying in a plane passing through the source line A'A'. It was discovered that if the images are narrowed (essentially to zero width in a certain approximation) by distorting the magnetic field, two changes of the images occur: first, the images are now necessarily curves in space rather than straight lines; second, the image produced by a light isotope is (in this approximation) a curve of the same size and shape as that produced by a heavier isotope, but is displaced, from the image produced by the heavier isotope, not toward the source but in a direction at 45° as shown by the line FF in Figure 2A. This suggests that both images could be made to lie in a plane passing through the line FF at right angles to the median plane. Further calculations show that this is indeed possible and more efficient isotope separation is achieved with curved receiver slots lying in the plane thus defined.

The theory of shimming, i. e., the mathematical methods used in the calculations are now described: The effects of the inhomogeneity in the magnetic field on the focus of the beam may be obtained by integrating the equations of motion of charged particles in an inhomogeneous magnetic field. Since the magnetic field will consist of a homogeneous field plus an inhomogeneous field, which will usually be of smaller magnitude, it is convenient to choose as the unit of measurement of the strength of the magnetic field at any point the strength of the homogeneous field ($H_0$) and as the unit of length the radius of curvature ($R_0$) (hereafter to be referred to as the unperturbed radius) of the charged particle in question in that homogeneous magnetic field. In these units the equations of motion in vector notation, may be written as follows:

$$\frac{d^2\vec{r}}{ds^2}=\frac{d\vec{r}}{ds}\times(\vec{1}+\vec{h}) \qquad (1)$$

in which the vector $$\vec{r}$$

designates the position of the ion as a function of $s$, the path length along the orbit as measured from the source.

$$\vec{1}$$

is a constant unit vector having the direction of the homogeneous magnetic field.

$$\vec{h}$$

is a vector representing the magnitude and direction of the additional inhomogeneous magnetic field produced by the shims. This differential equation has as its first integral:

$$\frac{d\vec{r}}{ds}=\left(\frac{d\vec{r}}{ds}\right)_0+(\vec{r}\times\vec{1})-(\vec{r}_0\times\vec{1})+\int_0^s d\vec{r}\times\vec{h} \qquad (2)$$

$$\left(\frac{d\vec{r}}{ds}\right)_0$$

is a unit vector having the initial direction of motion of the charged particles, i. e., the direction of the ion immediately upon leaving the source;

$$\vec{r}_0$$

is the initial position vector of the charged partcle. As $$\frac{d\vec{r}}{ds}$$

is a unit vector, the right hand side of Eq. 2 can be squared and set equal to one:

$$1+2\left[\int_0^s d\vec{r}\times(\vec{1}+\vec{h})\right]\cdot\left(\frac{d\vec{r}}{ds}\right)_0+\left[\int_0^s d\vec{r}\times(\vec{1}+\vec{h})\right]^2=1 \qquad (3)$$

The charged particles are usually drawn out of an arc in the source by an electrostatic field and brought to a focus in or near the source which focus is real or virtual, and from which the particles spread out. The shape of this source focus depends on the geometry of the arc and accelerating system. By methods now well known in the art, it can be made a straight line. In all subsequent calculations this source focus will be taken to be the starting place of the ions. The initial direction of motion of the ions emerging from any point of the source focus usually lies in a plane parallel to the median plane. In practice, since the source focus is of finite width, its width must be added to the collector focus width. However, for the purpose of simplicity, the calculations presented here will be given for a line source.

It is convenient to use a rectangular coordinate system with its origin at the midpoint of the line source focus, its $z$ axis parallel to the homogeneous magnetic field, its $x$ axis the source-collector line, and its $y$ axis completing a right handed system. The plane $z=0$ is then recognized to be the median plane herebefore mentioned.

The shape of the beam focus, that is, a cross section of the beam envelope at the place of collection will be called the beam pattern. The beam pattern can be calculated from (2) by integrating $$d\vec{r}\times\vec{h}$$

from the source around the orbit to the collector using (3) to simplify the expressions.

$$\frac{dx}{dy}=\frac{\left(\frac{dx}{ds}\right)_0+y+\int_0^s(h_z dy-h_y dz)}{\sqrt{1-\left[\left(\frac{dx}{ds}\right)_0+y+\int_0^s(h_z dy-h_y dz)\right]^2-\left[\left(\frac{dz}{ds}\right)_0+\int_0^s(h_y dx-h_x dy)\right]^2}} \qquad (4)$$

$$\delta x=2-x-\left(\frac{dx}{ds}\right)_0^2-\left(\frac{dz}{ds}\right)_0^2-\left(\frac{dx}{ds}\right)_0 y=\int_0^{s_m}(h_z dx-h_x dz)+\frac{1}{2}\left[\int_0^{s_m}(h_z dy-h_y dz)\right]^2+\frac{1}{2}\left[\int_0^{s_m}(h_y dx-h_x dy)\right]^2+\left(\frac{dx}{ds}\right)_0\int_0^{s_m}(h_z d_y-h_y dz)+\left(\frac{dz}{ds}\right)_0\int_0^{s_m}(h_y dx-h_x dy) \qquad (5)$$

$$\delta z = z - z_0 - s_m\left(\frac{dz}{ds}\right)_0 = \int_0^{s_m}(s_m - s)(h_y dx - h_x dy) \quad (6)$$

$h_x$, $h_y$ and $h_z$ are the $x$, $y$, and $z$ components respectively of $$\vec{h}$$

the additional inhomogeneous magnetic field produced by the shims. In (5) terms of the fourth and higher degree in $$\int \vec{h} \times d\vec{r}, \left(\frac{dx}{ds}\right)_0 \quad \text{and} \quad \left(\frac{dz}{ds}\right)_0$$

have been neglected. As before, the units of field strength and length are $H_0$ and $R_0$ respectively.

These approximations are accurate in the vicinity of the receiver; that is, near the position $y=0$, $x=2$. Subscript $_0$ denotes the value of a quantity at the source.

The integrals in (4) (5) (6) are line integrals extended along the ion trajectory. The indicated limits of integration are values of the path length $s$ measured along the trajectory from the source to the point $x, y, z$; in Equation 4 this may be any point on the trajectory; in (5) it is a point of the collector surface, and correspondingly $s_m$ denotes the total path length from source to collector. Because these trajectories are not known in advance of the calculation, it is clear that further approximation is required before the beam pattern in the neighborhood of the receiver can be found. One useful approximation is obtained by extending the integrals along the "unperturbed" circular trajectories for ions moving in the homogeneous magnetic field. The approximation is improved as explained below, by integrating along better approximations to the true trajectories.

The beam pattern in the plane $y=0$ is given by the equality of the second and third members of Equations 5 and 6 by setting $y=0$ in the last term of the second member of Equation 5. Similarly the beam pattern in the 45° plane discussed above is given by setting $y=2-x$. In either case the equations give $x$ and $z$ as functions of $$\left(\frac{dx}{ds}\right)_0$$

and $z_0$ throughout the beam as intercepted by the plane in question.

$$\left(\frac{dz}{ds}\right)_0$$

which characterizes the initial inclination of the ion path to the $x$—$y$ plane, is presumed known as a function of $$\left(\frac{dx}{ds}\right)_0$$

and $z_0$. For the type of source commonly employed, $$\left(\frac{dz}{ds}\right)_0$$

is substantially zero throughout. Equations 5 and 6 serve further to define the quantities $\delta x$ and $\delta z$ discussed below; they are the displacements of the end of the path produced by the shimming.

The conditions on the shape of the beam pattern can be seen by a study of the dominant term $$\int_0^{s_m} h_z \frac{dx}{ds} ds$$

of (5). Since only in the neighborhood $y=1$, i. e., a quarter circle around the orbit, is $$\frac{dx}{ds}$$

at least of the order unity, most of $\delta x$ arises from $h_z$ there; hence the inhomogeneity can be used most efficiently by concentrating it in this region. This location of the shim has also the advantage that it gives a minimum disturbance to the source and collector.

$$\left(\frac{dx}{ds}\right)_0$$

will be denoted by $\alpha$. This is approximately the angle in radians between the projections, on the $x$—$y$ plane, of the initial direction of motion and of that of the zero angle orbit.

In this region the orbits can be approximately represented as circles displaced in the $y$ direction by a distance $\alpha$ in the units already noted, from the zero-angle orbit. (Cf. Figure 2.) Then since $h_z$ is a solution of Laplace's equation, $\delta x$ is a two dimensional harmonic function in the variables $\alpha$ and $z$, in the approximation that includes only the aforementioned dominant term of $\delta x$, and as will be shown later, in certain higher approximations also:

$$\left(\frac{\partial^2}{\partial \alpha^2} + \frac{\partial^2}{\partial z^2}\right)\delta x = 0 \quad (7)$$

As the purpose of shimming is to counteract the geometrical defocusing $\alpha^2$, $\delta x$ should contain a term $-\alpha^2$. Then (7) requires that it also contain a term $+z^2$. This means that $\delta x$ increases quadratically with $z$ so that the beam pattern is curved parabolically toward the source. To make the beam pattern in the case of a straight line source as nearly straight as possible the plane $z=0$ will be chosen as a plane of symmetry. Then the beam pattern on one side of this plane will be the mirror image of the beam pattern on the other side of the plane; $h_z$ will be even in $z$; $h_x$ and $h_y$ will be odd in $z$. Thus for not too large $z$, $h_x$ and $h_y$ will be in the neighborhood of zero insuring the smallness of the terms containing them in (5) and of the $z$ component of the motion of the ions.

If the beam contains two components whose unperturbed radii, are 1 and $1+\Delta R$, in units of $R_0$ the latter component passes through the shimming field displaced by a distance $\Delta R$ in the $y$ direction; hence the $-\alpha^2$ term in $\delta x$ becomes $-(\alpha+\Delta R)^2 = -\alpha^2 - 2\alpha\Delta R - (\Delta R)^2$. The second term gives rise to a defocusing linear in $\alpha$. If the collector is moved in the direction of $-y$ a distance $2\Delta R$ the beam will again be focused because of the last term in the second member of Equation 5. But the orbit of the second component has a diameter greater by $2\Delta R$ than that of the first so the actual focus is displaced along a line making a 45° angle with the $x$ axis. Thus two materials of different mass, consequently which pass through the separator on orbits of different radii, are best collected at their respective foci, along this 45° line. The beam pattern on this 45° plane is different from that on the plane $y=0$. The beam pattern on the 0° plane, i. e., the $xz$ plane is obtained by plotting the positions in this plane of the end points of the various ion orbits. Relative to the endpoint of the zero angle orbit, for which $\alpha=0$, $z_0=0$, the endpoint of an orbit characterized by initial values $\alpha, z_0$ has cartesian coordinates.

$$\left\{\begin{array}{l} \alpha^2 + \delta x(\alpha, z_0) - \delta x(0,0) \\ \text{and} \\ z_0 + \delta z(\alpha, z_0) - \delta z(0,0) \end{array}\right\} \quad (8.1)$$

The beam pattern on the 45° plane is similarly obtained: the cartesian coordinates of the endpoint of an orbit in this plane are $$\left\{\begin{array}{l} \frac{\sqrt{2}}{1-\alpha}[\alpha^2 + \delta x(\alpha, z_0) - \delta x(0,0)] \\ \text{and} \\ z_0 + \delta z(\alpha, z_0) - \delta z(0,0) \end{array}\right\} \quad (8.2)$$

This correction of the focusing due to a displacement of the beam in the $y$ direction by displacement of the collector makes the exact $y$ position of the shims not critical.

As Equations 5 and 6 and the geometrical focusing condition do not give a unique design for a shim, other demands of various forms of the spectro-separator can be met with the remaining degrees of freedom. That is, the shims may be elongated members called strip shims, or discrete separate shims called spot shims or a special case of a strip shim called a periodic shim as explained later. Furthermore, the shim need not be attached to the pole pieces but may be suspended therebetween and as designated hereinafter as a fish shim.

Before discussing the various types of shims further, and in order to clarify the use thereof in a magnetic mass spectro-separator, reference is now made to Figures 1 through 4, in which the main portions of operating models of such a device are illustrated.

Essentially the device includes a pair of magnetic poles 6 and 7 which serve to establish a substantially homogeneous field between them represented by arrow 8. An evacuated tank (C-shaped in Figures 1 and 2, rectangular in Figure 3) disposed within the field is connected to low pressure mechanism 11 and contains an ion source 12 and a target or receiver 13 located at opposite points on a circularly curved beam path 14. The ion source is shown to be linear or narrowly rectangular following generally the shape of the arc 16 though curvature of the source may be beneficial under certain conditions as will be explained in greater detail hereinafter. The source is connected to a suitable electric supply 17 and with the cooperation of accelerating electrodes 18, furnishes a diverging positive ion beam 19 containing ions of the materials or isotopes to be separated.

*Strip shim (linear shim)*

To make the most efficient use of the magnetic volume, it is desirable to run several beams in one tank. One arrangement is to mount several arcs along a straight line, the $x$ axis, spaced so as to permit successful operation of arcs and collectors. In this setup different parts of different beams pass through the same magnetic field so that a shim that focuses one beam must also focus another beam displaced along the $x$ axis. This requirement can be met by making the magnetic field, hence the shim, the same for all values of $x$. Such a shim is called a strip shim. The focusing problem then reduces to one of two dimensions.

The source is assumed such that $$\left(\frac{dz}{ds}\right)_0=0$$

Let $$Y=\alpha+y+\int_0^s[h_z(y',z')dy'-h_y(y',z')dz']$$

then $$\delta x(\alpha,z_0)=\int_0^{s_m}h_z(y,z)\frac{Y}{\sqrt{1-Y^2+\left\{\int_0^s h_y(y',z')dx'\right\}^2}}dy+\frac{1}{2}\left\{\int_0^{s_m}h_y(y,z)dx\right\}^2 \quad (9)$$

$$\delta z(\alpha,z_0)=\frac{s_m}{2}\int_0^{s_m}h_y(y,z)\frac{Y}{\sqrt{1-Y^2+\left\{\int_0^s h_y(y',z')dx'\right\}^2}}dy \quad (10)$$

The integrals in the fraction that occurs in Equations 9 and 10 are line integrals (the prime denoting variables of integration) along the trajectory from the source to the point $y,z$ (corresponding to path length S), which is the variable point for the final integration. These integrals are generally small compared to $\alpha+y$; for a first approximation they are set equal to zero; this is equivalent to integrating Equations 5 and 6 along the unperturbed orbits. A better approximation is then obtained by utilizing the fact, referred to above, that the shim field $h_y,h_z$, will be made very small except in the vicinity of the position $y=1$ so that the fraction occurring in (9) and (10) needs to be known accurately only for such values of $y$. For $y$ near $y=1$ it is sufficient to approximate the integral by a linear function of $y$;

$$\int_0^s[h_z(y',z')dy'-h_y(y',z')dz']=hy+w$$

where $h$ and $w$ are constants discussed below. Furthermore, the squares of the small quantities $$\int_0^s h_y(y',z')dx'$$

and $$\int_0^{s_m}h_y(y,z)dx$$

will be dropped, and the path of the final integrations in (9) and (10) will be confined to the plane $z=z_0$. Lastly it should be remarked that at a certain point $s=s_1$, of the ion path the radical in (9) and (10) vanishes: for earlier points ($0\leqslant s<s_1$) the positive square root should be taken and for later points ($s_1<s\leqslant s_m$) the negative square root should be taken. Substituting, $$\delta x(\alpha,z_0)=\int_0^{s_m}h_z(y,z_0)\frac{\alpha+y(1+h)+w}{\sqrt{1-[\alpha+y(1+h)+w]^2}}dy \quad (11)$$

$$\delta z(\alpha,\ z_0)=\int_0^{s_m}h_y(y,\ z_0)\frac{\alpha+y(1+h)+w}{\sqrt{1-[\alpha+y(1+h)+w]^2}}dy \quad (12)$$

Expressions 11 and 12 are still to be understood as line integrals with the sign of the radical governed by the same rule as for 9 and 10. They are written as ordinary integrals below. It is further supposed that $\delta x$ and $\delta z$ are to be evaluated for the plane $y=0$; however, since $h_y$ and $h_z$ are very small near the source and receiver, the functions $\delta x$ and $\delta z$ are practically independent of the precise manner of terminating the paths of integration, so that the result can be used for calculating the beam pattern on the 45° plane or any other surface that intercepts the beam near the point $x=2$, $y=0$.

Let $$\alpha+y(i+h)+w=\xi$$

$$\delta x(\alpha,\ z_0)=2\int_{\alpha+w}^1\frac{d\xi}{1+h}h_z\left(\frac{\xi-\alpha-w}{1+h},\ z_0\right)\frac{\xi}{\sqrt{1-\xi^2}} \quad (13)$$

$$\delta z(\alpha,\ z_0)=2\left(\frac{s_m}{2}\right)\int_{\alpha+w}^1\frac{d\xi}{1+h}h_y\left(\frac{\xi-\alpha-w}{1+h},z_0\right)\frac{\xi}{\sqrt{1-\xi^2}} \quad (14)$$

Where $$\frac{s_m}{2}=\frac{\pi}{2}-\alpha-\frac{\delta x}{2}$$

Hence $\delta x$ and $\delta z$ must satisfy the conditions $$\frac{\partial}{\partial Z}\delta x=-\frac{\partial}{\partial\alpha}\left(\frac{2}{s_m}\delta z\right) \quad (15)$$

$$\frac{\partial}{\partial\alpha}\delta x=-\frac{\partial}{\partial Z}\left(\frac{2}{s_m}\delta z\right) \quad (16)$$

where $$Z=z_0(1+h)$$

Equations 15 and 16 have the form of the Cauchy Riemann equations and consequently in this approximation the complex function $\Phi$ defined by $$\delta x-i\frac{2}{s_m}\delta z=\Phi$$

is analytic in the complex variable $\zeta$ defined by $\alpha+iZ=\zeta$.

$\Phi$ is called the focusing function: Its real and imaginary parts, $$\delta x \text{ and } -\frac{2}{s_m}\delta z$$

behave like the components of a magnetic field with respect to "coordinates" $\alpha$ and Z. This field is sometimes referred to as the "focusing field."

$$\delta x \text{ and } -\frac{2}{s_m}\delta z$$

are specially weighted averages of the actual magnetic field as shown by Equations 13 and 14.

Since the geometrical focusing condition requires the presence of a term of the form $-\alpha^2$ in $\delta x$, there must appear its companion term $Z^2$ in $\delta x$ and a term $2\alpha_m Z$ in $$\frac{2}{s_m}\delta z$$

Hence above the median plane (positive $z$) ions travelling on positive angle trajectories will be thrown up (positive $\delta z$), and on negative angles trajectories thrown down (negative $\delta z$).

Because the beam pattern is curved, this displacement in the $z$ direction leads to a defocusing of the beam. An attempt to correct this defocusing can be made by introducing other powers of $\zeta$ into the focusing function and adjusting their coefficients to make a narrow beam pattern. It can be shown that it is impossible with a strip shim to achieve a perfect focus simultaneously for several values of $z_0+\delta z$, but a satisfactory approximation to a perfect focus can be obtained by suitable choice of the coefficients as explained below.

The focusing requirements serve to define $\Phi$ only in a limited domain of $\alpha$ and Z. This domain is bounded approximately by $|z|=z_m$ (½ the distance between the pole faces) and $|\alpha|=\alpha_m+z_m$ ($\alpha_m$=maximum angle in the beam) since the behavior of a magnetic field at one point is related to its behavior a distance $\approx z_m$ to either side. Outside this domain the focusing function may be altered without changing the focus. For reasons of electrical clearance, etc., it is desirable to not have shims near the source. This can be achieved by bringing the focusing function $\Phi$ down to zero in the strip $|z|<z_m$ outside the focusing domain $|\alpha|>\alpha_m+z_m$; that is, the focusing function is well represented by the previously mentioned combination of powers of $\zeta$ in the focusing domain but deviates radically therefrom outside it. The way in which this is done is explained later.

The coefficients of the powers of $\zeta$ in $\Phi$ are chosen to give the best focus. This choice for a given maximum $z_0$ and angular spread of the beam is determined by plotting the beam pattern on for example the 45° plane and adjusting the coefficients to give the sharpest focus.

Figure 7A:
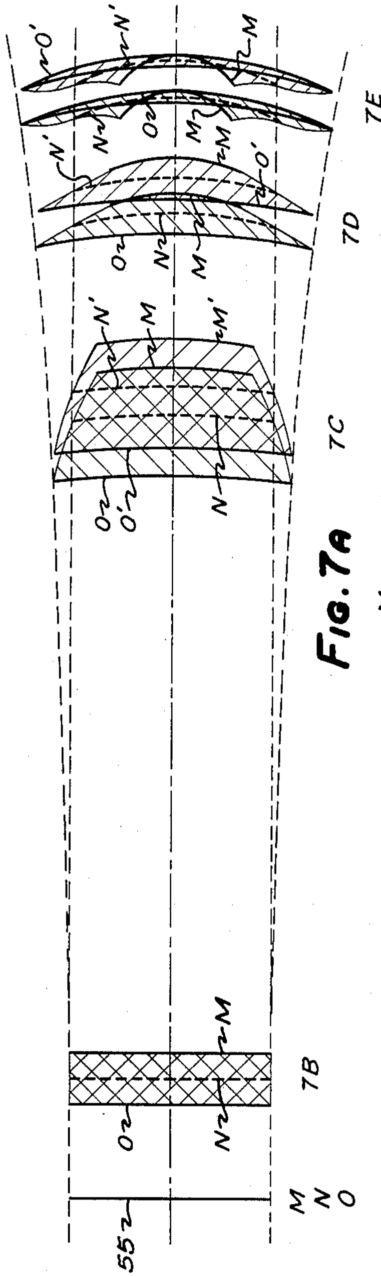
Figures 7 and 7A are diagrams illustrating the progressive distortion of an ion beam of a material containing two masses by shims as well as the progressive separation of the materials.
Figure 7:
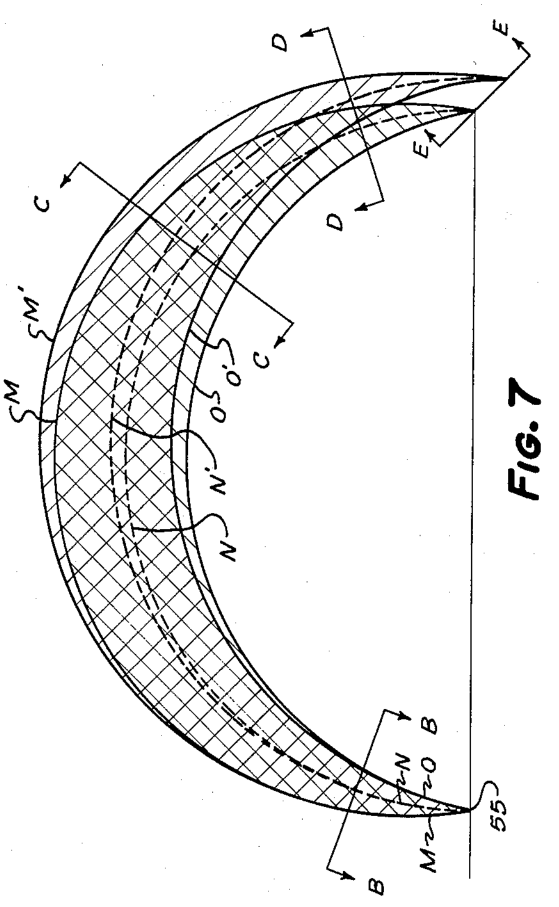
Figure 8:
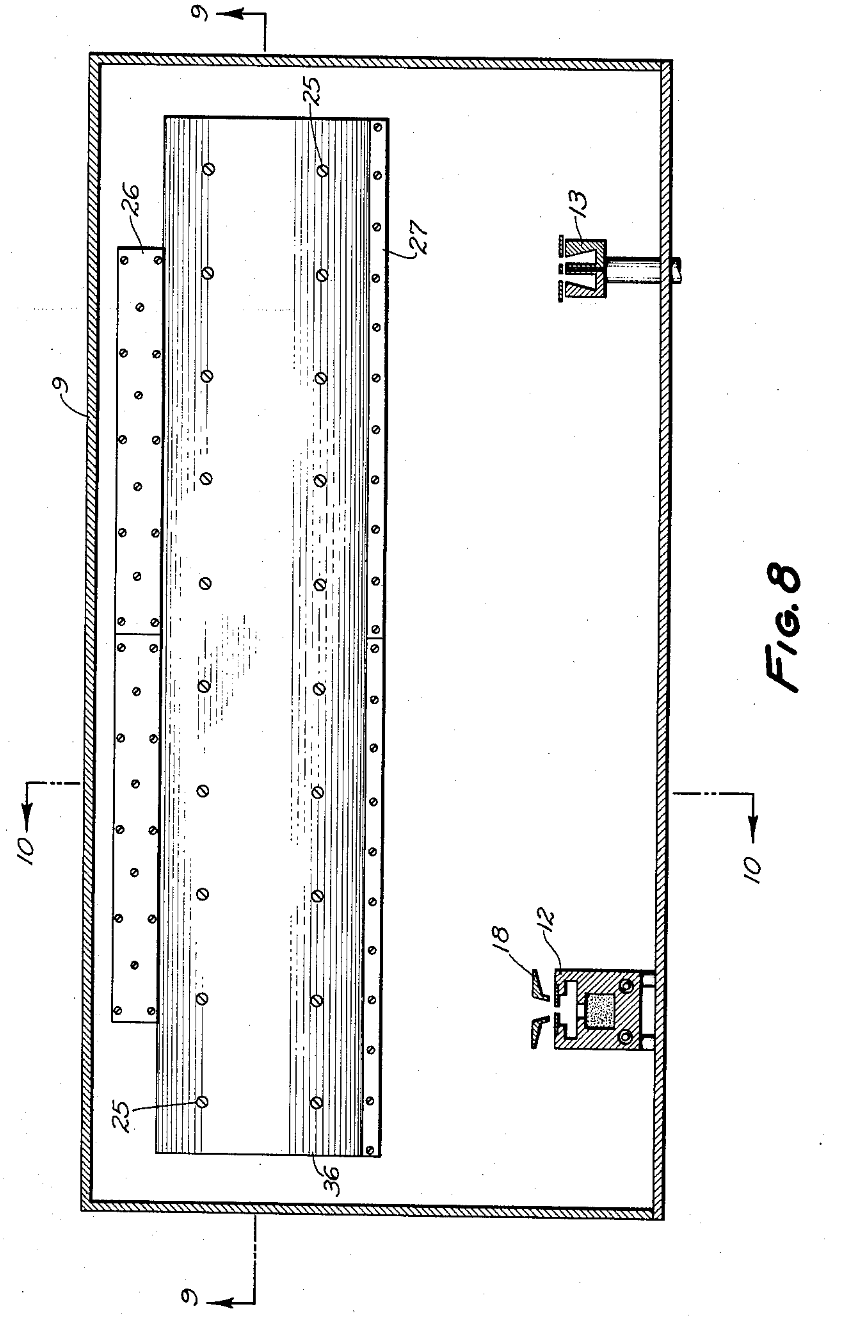
Figure 8 is a view similar to Figure 3, showing the means for mounting a shim within the calutron tank.
Figure 9:
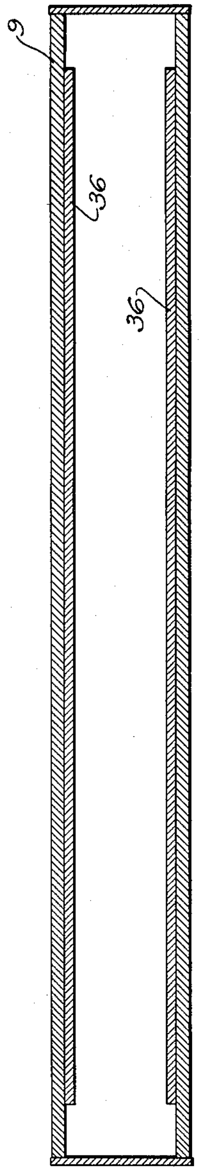
Figure 9 is a cross section the plane of which is indicated by the line 9—9 of Figure 8.
Figure 10:
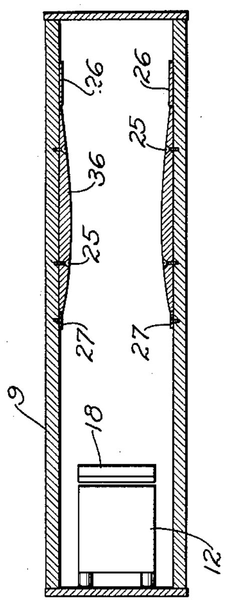
Figure 10 is a cross section the plane of which is indicated by the line 10—10 of Figure 8.
Figure 11:
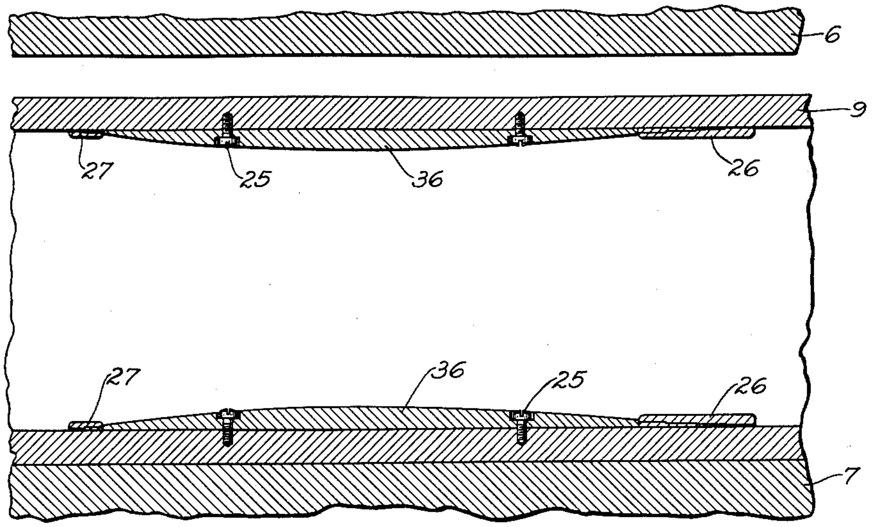
Figure 11 is an enlarged fragment of the shim portions of the structure as shown in Figure 10.
Figure 12:
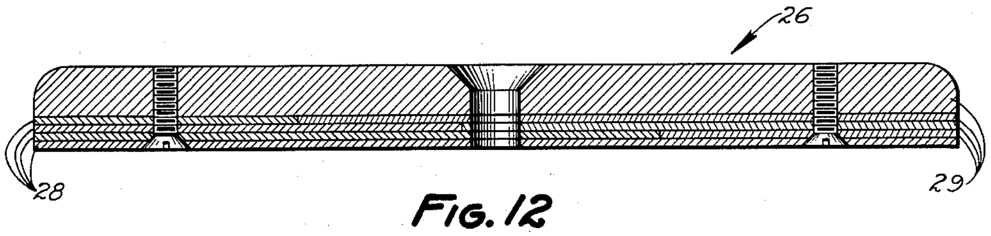
Figure 12 is a cross section to an enlarged scale of the right hand shim margin illustrated in Figure 11.
Figure 13:
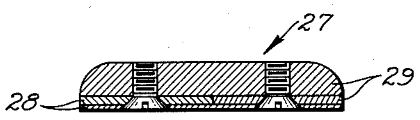
Figure 13 is a cross section to an enlarged scale of the left hand shim margin illustrated in Figure 11.

This plotting requires knowledge of the value of $h$, because $\Phi$ is a function of $\alpha$ and Z, whereas $\delta x$ and $\delta z$ must be expressed in terms of $\alpha$ and $z_0$ according to Expressions 8.1 or 8.2. It has been found satisfactory to obtain a first approximation by carrying the entire calculation through roughly with $h=0$ (as noted above, this is equivalent to integrating along the unperturbed orbits); then to obtain values of $h$ and $w$ from the first approximation by plotting $\int_0^y h_z(y',0)dy'$ against $y$ in a graph and approximately the graph with a straight line $hy+w$; and lastly to complete the calculation (including plotting the beam pattern and adjusting the coefficients in $\Phi$) with these values of $h$ and $w$. The number of terms with coefficients large enough to influence the beam pattern is limited by the requirement that the reduction to zero of the focusing function $\Phi$, outside the focusing domain must not represent such a violent change in the function that the effects of this cut-off are propagated into the beam pattern. In practice this restriction usually permits the use of only the first 4 terms $\zeta$, $\zeta^2$, $\zeta^3$, $\zeta^4$, whose coefficients will be designated as $a$, $a_2$, $a_3$, $a_4$, respectively, in calculating the beam pattern. As the maximum $z_0$ becomes small, the best choice of coefficients approaches $\alpha_2=-1$, $\alpha_1=\alpha_3=\alpha_4=0$ and an arbitrarily good focus may be obtained. For a maximum $z_0=0.15$ (16 inch source arc with a 96 inch source-collector distance) and an angular spread of $2\alpha_m=20°$, the best choice of coefficients was found to be $a_1=+0.0215$, $a_2=-0.89$, $a_3=-0.7$, $a_4=+0.9$. This combination gives a focus of roughly uniform width of the order of 0.006 (in units of the unperturbed orbit radius) (Cf. Figure 7).

It is possible to construct beam patterns that are much narrower near $z=0$, but which flare out for large $z_0+\delta z$. An examination of such beam patterns for a particular $z_0+\delta z$ shows that there is present in $\delta x$ a part linear in $\alpha$. Such a linear part can be focused by a motion of the collector. But since the linear part, hence the position of the collector, is different for each value of $z_0+\delta z$, different positions are required for each height. This can be accomplished by giving the collector face a curvature in the $y$ direction. On such a collector a beam pattern for maximum $z_0=0.15$ and angular spread $2\alpha_m=20°$ having everywhere a width less than 0.003 can be produced. Its coefficients are $a_1=+0.02$ $a_2=-1$ $a_3=-0.67$ $a_4=+1$. The perpendicular distance from the center of the curve of the collector face to the chord is 0.09.

With the focusing function completely defined, the integral Equations 9 and 10 could be solved for $h_y$ and $h_z$. The resulting functions $h_y$ $(y, z)$ and $h_z$ $(y, z)$ do not in general satisfy exactly the differential equations of a magnetic field because the relations that $\delta x$ and $\delta z$ were made to satisfy were obtained from the less accurate Equations 11 and 12.

The preferred procedure is to determine $h_y$ and $h_z$ in the median plane ($z_0=z=0$) from Equations 9 and 10 and elsewhere by the differential equations of the magnetic field. Then the $\delta x$ and $\delta z$ as computed from (9) and (10) outside the median plane differ imperceptibly from those used in constructing the beam pattern, e. g., those occurring in the function $\Phi$. To find the field, the following transformations are made on the integral Equation 9, after dropping small terms containing $h_y$.

Let $$\eta=\alpha+y+\int h_z dy \tag{17}$$

$$\delta x(\alpha,0)=2\int_\alpha^1 d\eta\frac{h_z(y,0)}{1+h_z(y,0)}\frac{\eta}{\sqrt{1-\eta^2}}=$$

$$2\int_\alpha^1 d\eta F(\eta-\alpha)\frac{\eta}{\sqrt{1-\eta^2}} \tag{18}$$

The integral equation is thereby linearized and is solved for ($\alpha$) in terms of $\delta x(\alpha,0)$ by standard methods. From F ($\alpha$), $h_z$ $(y, 0)$ may be obtained $$F(\alpha)=\int_1^\infty d\xi K(\xi)\delta x(\xi-\alpha,0) \tag{19}$$

Wherein $$K(1+u)=\begin{cases}0 \text{ if } u<0\\ \frac{-1}{\pi\sqrt{2u}}\left[1+\frac{3}{4}u+\frac{11}{32}u^2+\frac{83}{640}u^3+\frac{3,321}{71,680}u^4+\frac{2,083}{122,880}u^5+\frac{993,772}{151,388,160}u^6+\ldots\right] \text{ if } 0<u<2\end{cases} \tag{20}$$

Then $$y = \int_0^{\eta} [1 - F(\alpha)] d\alpha \quad (21)$$

$$h_z(y,0) = \frac{F(\eta)}{1 - F(\eta)} \quad (22)$$

From $h_z$ $(y, 0)$, the inhomogeneous field in the median plane, the equipotential surfaces and the shim shape can be calculated, for example, by the method of flux plotting (see e. g., Electric Circuits, pp. 57–61, by the E. E. Staff of MIT, John Wiley and Sons 1940) or by an equivalent analytical procedure. The median plane $z=0$ may be taken as the surface of zero magnetic potential (it is an equipotential surface because $h_y$ $(y, 0)=0$). The quantity $\delta x(\alpha, 0)$ appearing in Equation 19 is the real part of $\Phi$ on the real axis (the imaginary part of $\Phi$ vanishes on the real axis). As noted above, $\Phi$ is given in the focussing domain, $|\alpha|<\alpha_m+z_m$ by a polynomial in $\alpha+iZ$ with coefficients adjusted to give a good focus. For $\alpha$ in this range, $\delta x$ $(\alpha, 0)$ is computed from the polynomial. For $\alpha$ outside this range $\delta x(\alpha, 0)$ is adjusted arbitrarily, by a graphical procedure, so that $\delta x(\alpha, 0)$ vanishes identically for $|\alpha|$ greater than about 2 $(\alpha_m+z_m)$, whereas for intermediate values of $\alpha$ a smooth curve is drawn joining the polynomial values for $|\alpha|<\alpha_m+z_m$ with the line $\delta x(\alpha, 0)\equiv 0$ for $|\alpha|>2(\alpha_m+x_m)$. This procedure is known as cut-off. As a result of it $\Phi$ $(\alpha+iZ)$ differs slightly from the polynomial values for points in the focussing domain but not on the real axis. But if the cut-off is done with sufficient care the difference is negligible in the focussing domain. The adequacy of the cut-off procedure and other approximations is tested by recomputing the beam pattern from the magnetic field, using Equations 9 and 10 with transformation 17 and the approximation of integrating in the plane $z=z_0$. This final computation of the beam pattern is also utilized in designing the slots in the ion receiver or collector. As a final check, it is sometimes desirable to calculate a few trajectories by a step-by-step integration of the exact Equation 2 especially to estimate the residual errors introduced into $\delta x$ and $\delta z$ by having integrated in the plane $z=z_0$.

Figure 5:
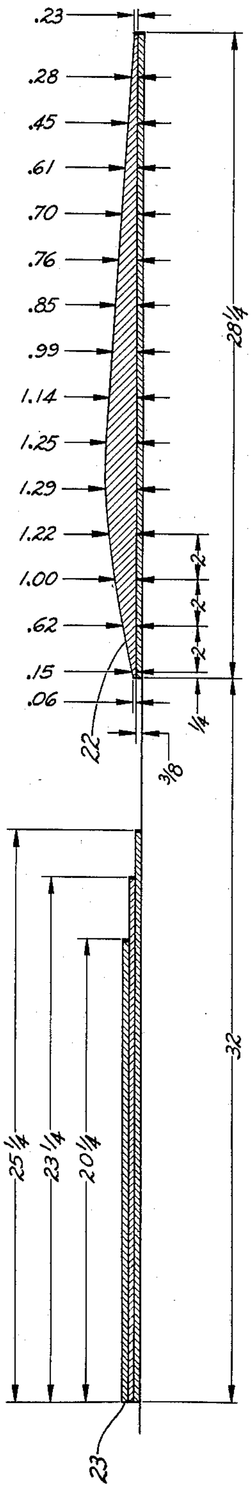
Figure 5 is a transverse cross section of two types of linear shims taken on the line 5—5 in Figure 2 the approximate dimensions being in inches.
Figure 5A:
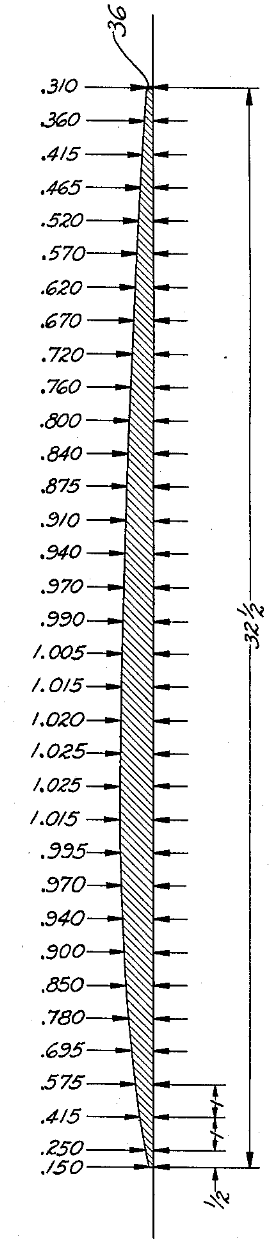
Figure 5A is a transverse cross section taken on the line 5A—5A in Figure 3, of another linear shim the approximate dimensions being in inches.

A drawing of the shim shape calculated using the coefficients $a_1=+0.0215$, $a_2=-0.89$, $a_3=0.7$, $a_4=+0.9$ is given approximately in Figure 5, Figure 5A indicating a variation of this shape obtained by using other coefficients.

Figure 14:
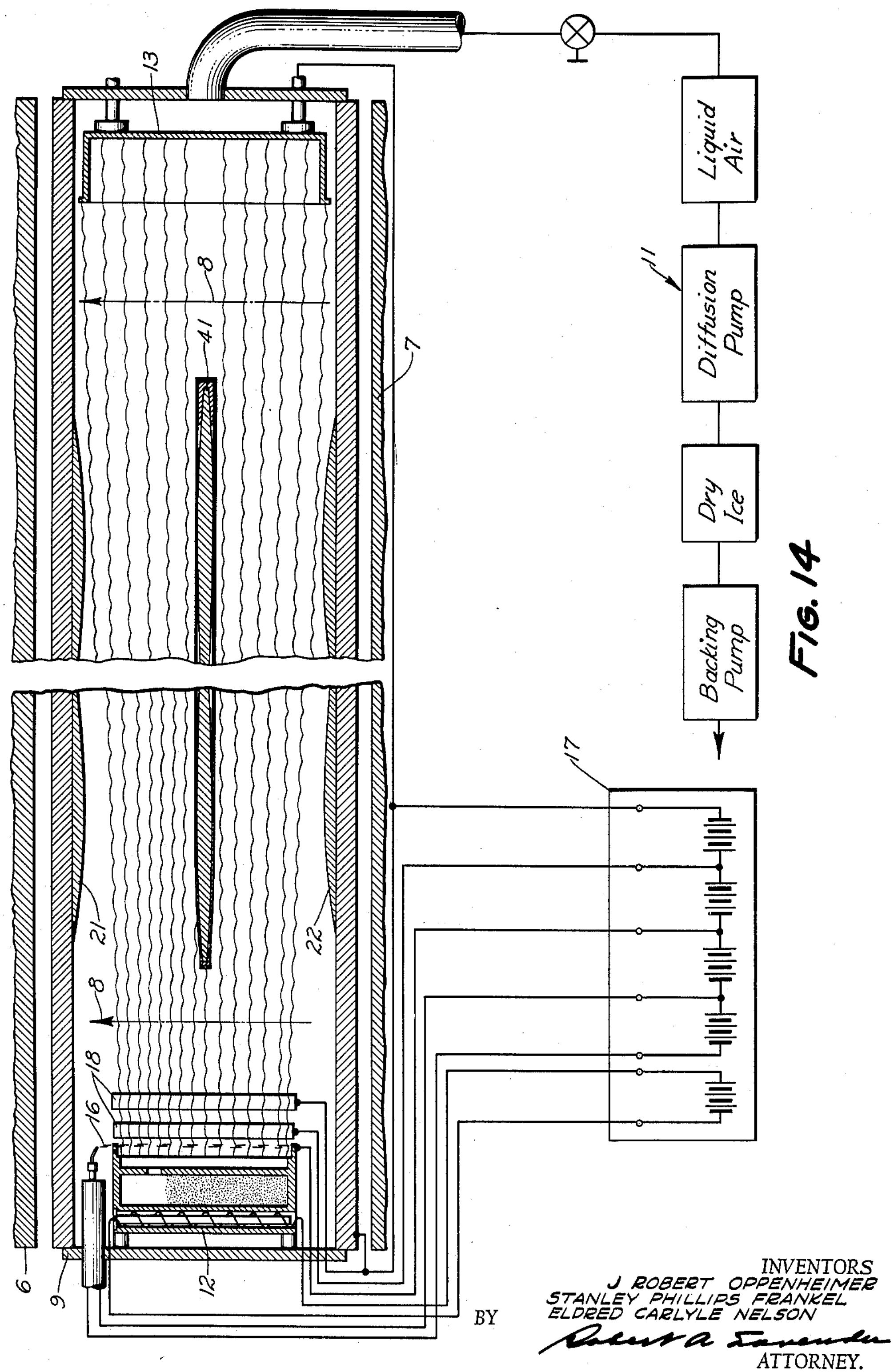
Figure 14 is a view comparable to Figure 4, but showing a calutron provided with a fish shim.

For source arcs of great length a sharp focus may be obtained by using a floating shim in the center gap dividing the beam into two sections, each section focusing separately. Such a floating shim is called a fish shim (Cf. Figure 14), and may be considered as another special case of the strip shim.

*Spot shims*

A magnetic spectro-separator in which only one source is to be operated does not require a shim that is invariant with respect to a displacement in a given direction. There, to define the problem, the condition that the shim surface be easily fabricated might be imposed, e. g., it could be turned on a lathe. The shim in such a case would comprise a plurality of cylindrical bosses on the pole pieces. It has been determined that by employing such a plurality of bosses, properly placed, good focusing may be obtained.

With three such "spots" or bosses, $\delta z$ may be made very small. The first spot is made a defocusing or anti-shim; the other two are focusing or positive shims; all three are of the same field strength (Cf. Figure 17). From Equation 6 it can be seen that if the anti-shim is placed near the source at $S=S_1$ and the two positive shims at $S=S_2$, $S=S_3$ respectively and $$-(S_m-S_1)+(S_m-S_2)+(S_m-S_3)=0$$

$\delta z$ will vanish and a charged particle that left the source at $z_0$ will arive at the collector at $z_0$. With such a placement the $\delta x$ from the negative spot and the second positive spot will almost cancel and the burden of counteracting the geometrical defocusing falls on the first positive spot. With this non-symmetric set of shims $$\int_0^{s_m} h_z dy$$

does not vanish as it does in the case of the strip shim and $$\left(\frac{dx}{ds}\right)_0 \int_0^{s_m} h_z dy$$

will contribute appreciably to $\delta x$. Hence analogous to finding the right combinations of harmonics for the strip shims $$\alpha \int_0^{s_m} h_z dy$$

and $$\int_0^{s_m} h_z dx$$

must be chosen to combine to $-\alpha^2$ in the focusing domain. The construction of each spot shim from $\vec{h}$ proceeds analogous to the case of the strip shim, the change from invariance under $x$ displacement to cylindrical symmetry having been made.

*Periodic shim*

If it is desired to operate several beams in adjacent magnetic volumes and yet not have the beams actually cross each other, the beams may be spaced periodically in the $y$ direction. The period may be of the order of one-half the radius of the circular orbits which is referred to as the base period. (See Figure 18.)

This periodic condition can be fulfilled by making the $y$ variation of the inhomogeneous magnetic field a linear combination of sine and cosine functions, the periods of which are integer multiples of the base period. The variation of the field along the orbit can be arranged to make $\delta z$ small as in the case of the spot shim by having first an anti-shimming region and then a positive shimming region. Here the focusing condition can be satisfied by making the field normal to the beam vary as $\alpha^2$. A very close approximation to such a field can be made in the region of the beam by a few sine and cosine functions. The shim is again the equipotentiential surface calculated from this field.

In order to have both a short base period and a large arc, a periodic fish shim may be necessary.

*Curved sources*

In the previous description of shims, only a straight line source has been considered. A shim can be calculated for any shape source if $$\left(\frac{d\vec{r}}{ds}\right)_0$$

is given for that specific shape.

If the source has the shape of an arc of a circle, with its curvature in the $y$, $z$ plane, all parts of the beam will be brought to the plane $z=0$ in the distance equal to the radius of curvature of this circle. With such a source the beam can be made to pass through the inhomogeneous field at this center of curvature. Then since all parts of the beam have effectively the same $z$ coordinate, $z=0$, in the shimmed field, no $z$ motion of the beam due to the inhomogeneity results and also all parts of the beam pattern have the same $x$ coordinate; that is, the beam pattern is not curved toward the source. The shim need then only counteract the geometrical defocusing $\alpha^2$ and can be calculated as before; e. g., as in the case of a strip shim using only the term $\xi^2$.

The curvature of the beam pattern toward the source may alternatively be reduced by curving the source toward the collector. The optimum arrangement is obtained by giving the source and beam pattern equal curvature toward each other. The calculation of the shim proceeds again in the manner of the specific model chosen; e. g., a strip shim.

As more specific examples thereof and pursuant to the principles of the invention herein, distortion of the magnetic field is accomplished as shown in the drawings by introducing into the interior of the tank 9, a pair of shims 21 and 22, of magnetic material, for example iron and preferably a metal which does not become saturated under operating conditions. These shims may be used alone or supplemented by additional shims such as 23 and 24 (Figure 2) which may be necessary in special cases where it is desired to have a shield correction near the source 12, and near the receiver 13. As has been noted before, it is desirable that the transition of the portions of the shim be gradual so that in section, shim 22 normally would present an approximately streamlined outline in the ion beam region as shown in Figures 5 and 5*a* in which the dimensions are in inches to indicate the order of magnitude of the size of the shims. However, supplemental shims such as 23 and 24 need only be of step laminar form (see Figure 5) since the transition at the source and at the receiver may be accomplished in this manner instead of having recourse to the curved transition required in the elongated main shim.

Figure 3:
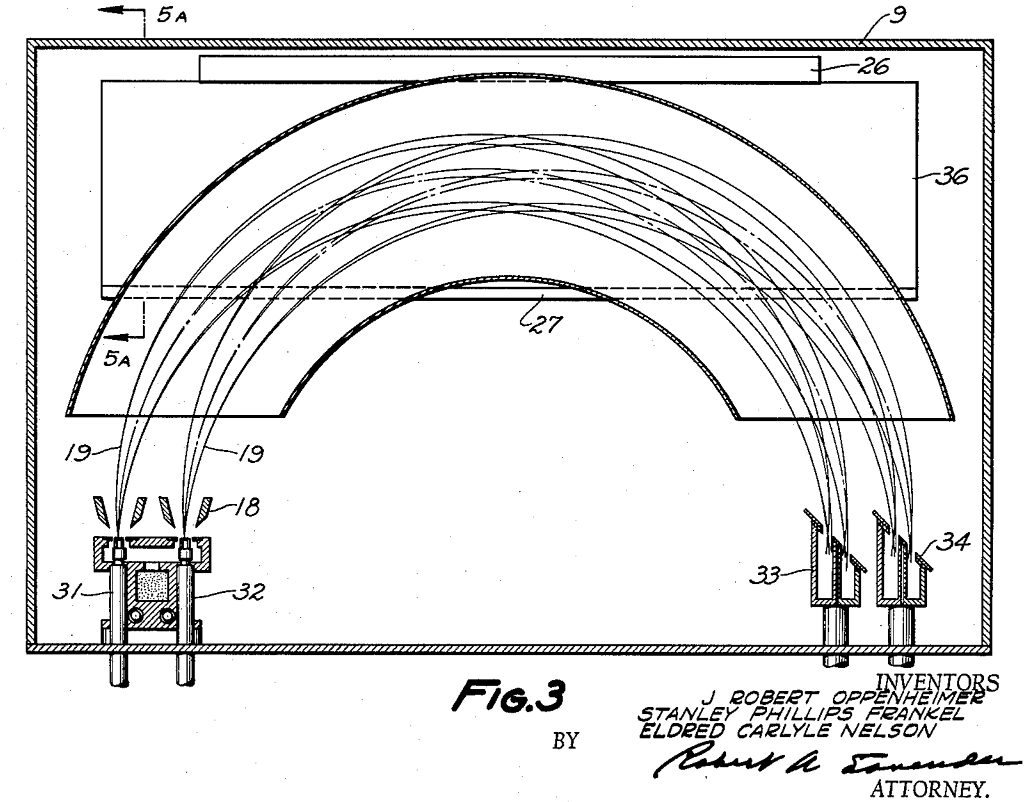
Figure 3 is a diagrammatic view comparable to Figure 2 showing another type of separating device in which a plurality of sources and receivers are employed.

In the case of a strip or linear shim, such as is illustrated in Figure 3 by shim 36, after fabrication it is fastened to the top and bottom walls of the tank by suitable fasteners such as screws 25 and thus become part of the tank and effectively part of the pole pieces of the magnet. Marginal strips 26 and 27 (Figures 8 through 13) may be additionally employed to assure close contact and the integral relationship of the shim and the tank. These marginal strips are preferably made of magnetic laminae 28 and non-magnetic laminae 29 arranged to approximate the proper shape. As has been pointed out hereinbefore, under the analysis of linear shims, the shims 36 are made uniform or linear in the direction parallel to the source-receiver line. Such a shim can readily accommodate a plurality of arcuate beams traversing the interior of the tank from a plurality of sources in the source-receiver line, for example 31 and 32, and a plurality of receivers, for example positioned as receivers 33 and 34 (Figure 3), and having their faces inclined to the source-receiver line at an angle of 45°. It should be remembered of course, that as referred to at this point, the beams are considered to include a mixture of elements or isotopes which are to be and actually are separated by the action of the device. A single beam thus may include for example, two or more isotopes which are substantially separated and arrive at predetermined slots in the receiver.

Although in Figure 2 only one source is shown, the shims are for convenience, of the linear type, being cut to a crescent outline for accommodation in the special tank shape. It is thus seen that the shims present to the beam a constricted tank surface, the constriction defining the amount of magnetic field distortion employed for improving the focus of the beam at the receiver.

Figure 15:
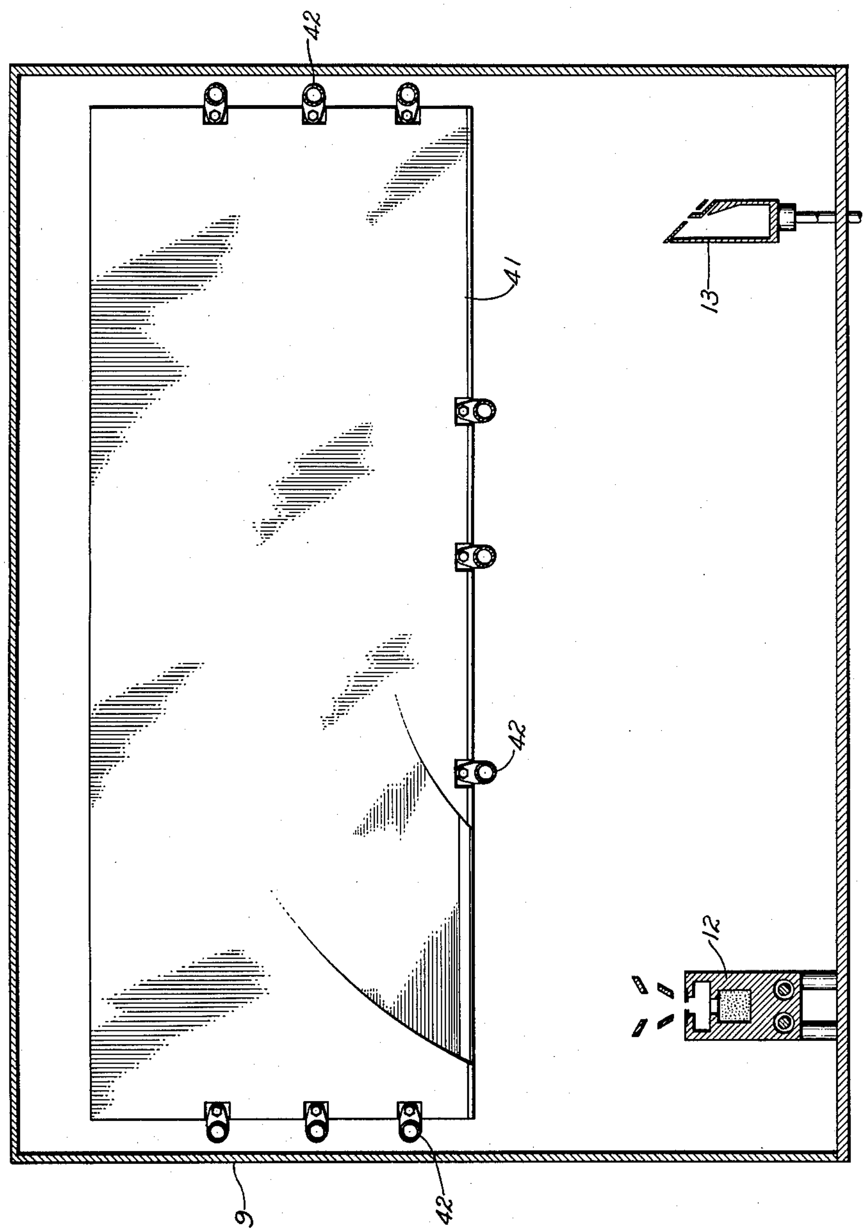
Figure 15 is a view similar to Figures 3 and 8, but showing a fish shim in plan within a calutron tank diagrammatically illustrated in cross section on a median, horizontal plane.
Figure 16:
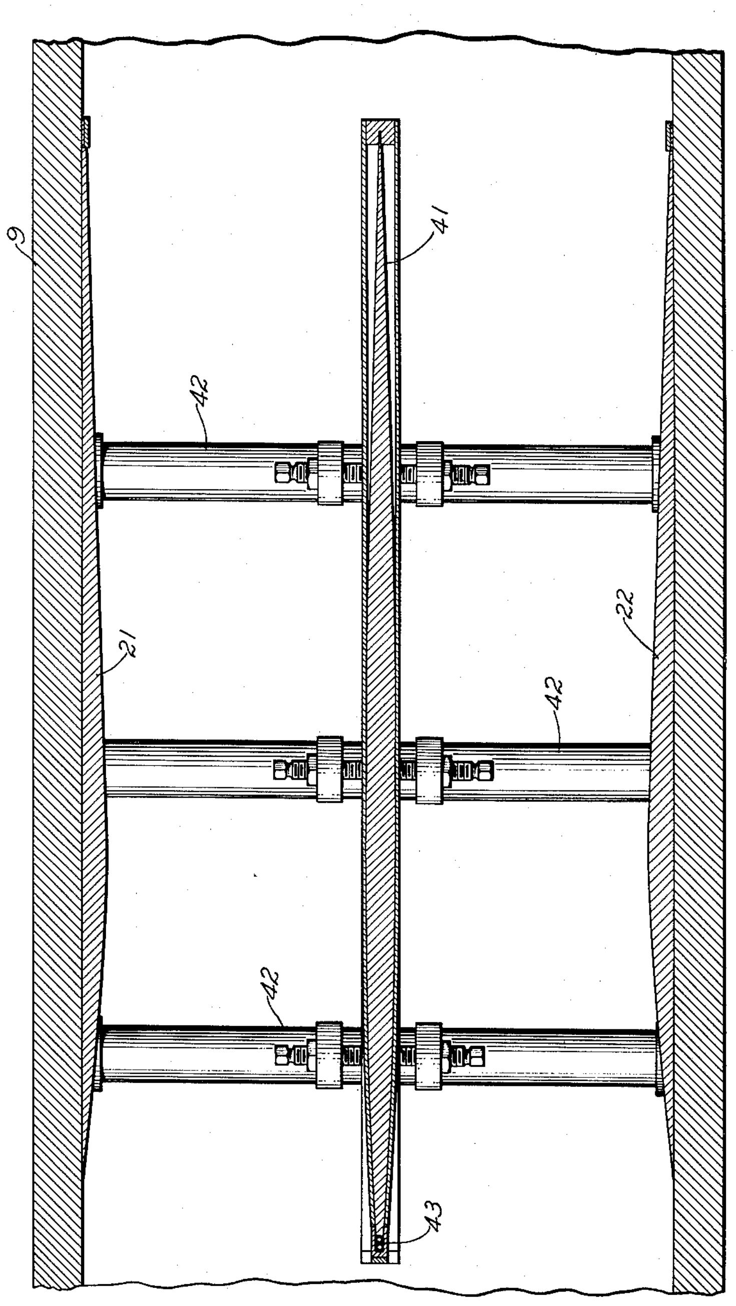
Figure 16 is a cross section of a calutron tank, illustrating the position of a fish shim therein.

The cross sectional shape as determined by the formulas hereinbefore set forth, will vary depending upon the unperturbed beam radius, the source height, the maximum angle of divergence of the beam at the source, the amount of "cut-off" desired to limit the size of the shim and the distance of the shim from the median plane. As may be seen from an examination of the calculations hereinbefore set forth, the shape dependence on the first two and last of these factors is essentially on the ratio of them. That is, if the ratio of the height of the source to the unperturbed beam radius remains the same, though the dimensions are increased, the cross sectional shape of the shim will remain the same except that the scale of the size will be increased. The configuration of the main shim is a portion of a cylindrical surface generated by a straight line moving so as to remain parallel to the source-receiver line and allowing a curve determined as hereinbefore set forth. The shapes shown in the accompanying drawings are substantial approximations of the actual contours employed successfully in the operation of a mass spectro-separator of the type described.

Where the arc length, that is, the source height is very large in order to afford large ion currents, an intermediate shim or fish shim may be employed as an auxiliary or alone, depending upon the focusing conditions desired. Such a shim is illustrated in Figures 14, 15 and 16, and is seen to be linear in the direction of the source-receiver line and substantially symmetrically streamlined above and below the median plane, as shown in the transverse sectional view. It is mechanically supported at its ends on the tank walls by suitable fasteners 42 (Figure 15). Local heating at the leading edge of the fish shim upon which the beam impinges, is carried away by coolant flowing through suitably protected cooling tubes 43. Thus effectively the beam from such a source is controlled by dividing the beam into two portions.

Figure 6A:
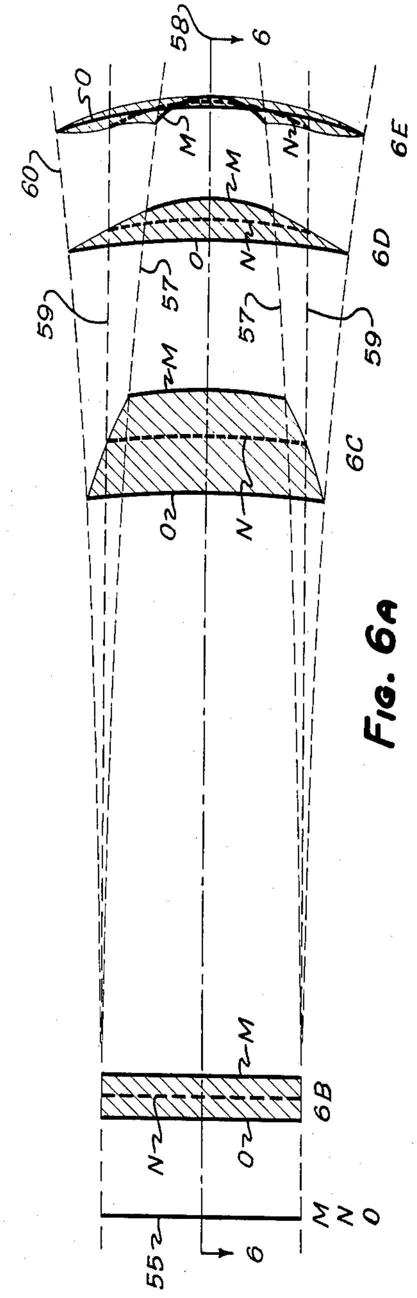
Figures 6 and 6A are diagrams illustrating the progressive distortion of an ion beam of a single mass material by shims.
Figure 6:
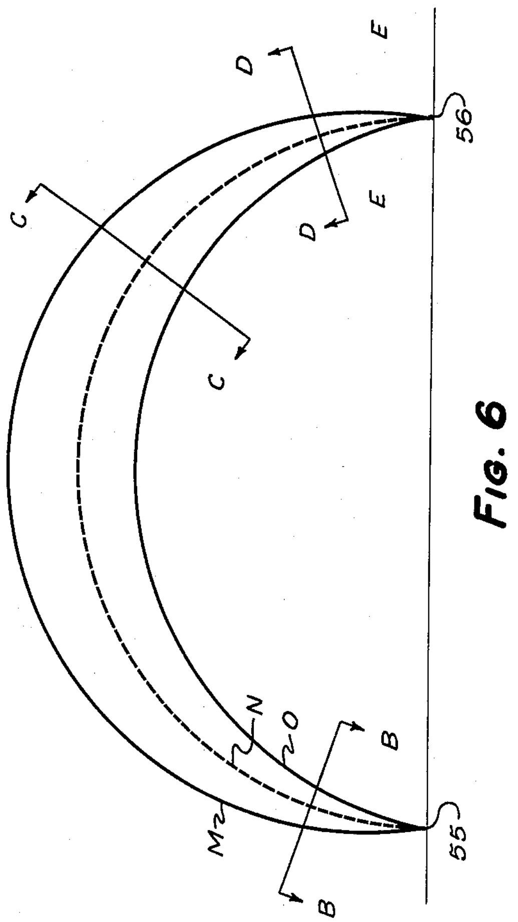

As shown in Figures 6 and 7, the result of shim placement is to distort the otherwise homogeneous magnetic field and thereby effect changes in the ion paths therethrough and consequently the beam envelope in a manner calculated to result in a narrowed beam pattern or image at the target. In Figure 6, an ion beam of a single isotopic mass is illustrated. More particularly, Figure 6 indicates the arcuate paths followed by specific ions when linear shims of the type described are employed in the separator. Various progressive sections shown in Figure 6*a* are taken across the entire beam as it travels from the source 55 to the receiver 56, to indicate the progressive changes which occur in the beam pattern. Section **6*c* indicates the divergence occurring from a finite line source to the maximum angle after which the ions pass into the region of the distorted magnetic field produced by a shim designed as hereinbefore set forth. It will be seen then, that ions in paths of curvature equal to path 57 are caused to move inwardly toward the median plane 58 and a certain amount of bowing of the path takes place. Ions in paths of curvature substantially equal to path 59 are not substantially deflected toward the median plane, but due to the distortion of the magnetic field, the beam is bowed, but at a greater radius of curvature than is the case of path 57. This bowing phenomena may be progressively followed by means of the reference points M, N and O. Paths similar to path 60 are bowed at a still greater radius, and inclined away from the median plane, so that the overall result is as shown in section 6*e* which is the image or cross section of the beam envelope at the source and which permits the narrowest practical slot in the receiver 56**.

The importance of the reduction in width of the image at the receiver is readily apparent in Figure 7, which is a schematic representation of an ion beam made up of ions of two isotopic masses and indicates the separation of these two masses by the device by means of sections of the beam envelope in various positions from the source 55 to the receiver 56. Here Figure 7A includes various sections, 7B, 7C, 7D and 7E which are schematic representations of the beam patterns produced by shim-induced inhomogeneities in the magnetic field traversed by the beam. The elongated patterns at the receiver, as shown in Figure 7A, a section taken on a plane inclined at 45° to the source-receiver line are similar for both isotopes and the narrowness thereof permits closer spacing of the receiver slots than was heretofore found practical, while at the same time minimizing the overlap or remixing of the isotopes sought to be separated.

Figure 17 indicates the manner of positioning a plurality of spot shims employed in a single source separator. This type of inhomogeneity in the magnetic field is brought about by employing a plurality of cylindrical bosses attached to the top and bottom walls of the tank by suitable means, such as for example, screws, and are preferably made of a magnetic metal such as iron or the like. In the schematic illustration, boss 70 is the defocusing shim or negative shim which serves to cause a wider divergence of the beam than would ordinarily be encountered, and changes the focusing conditions. This divergence is accomplished by shaping the inwardly extending end of the boss or spot shim somewhat as shown in the cross sectional view in Figure 17A. The amount of divergence is controlled by the size of the shim and the depth of the concavity or reentrant surface. Shims 71 and 72 of the type shown in Figures 17A and 17B serve successively to counteract the geometrical defocusing and cancel the defocusing effect of shim 70, and to focus the ion beam according to the selected pattern employing calculations of the type hereinbefore set forth under the discussion directed to spot shims.

Figure 18:
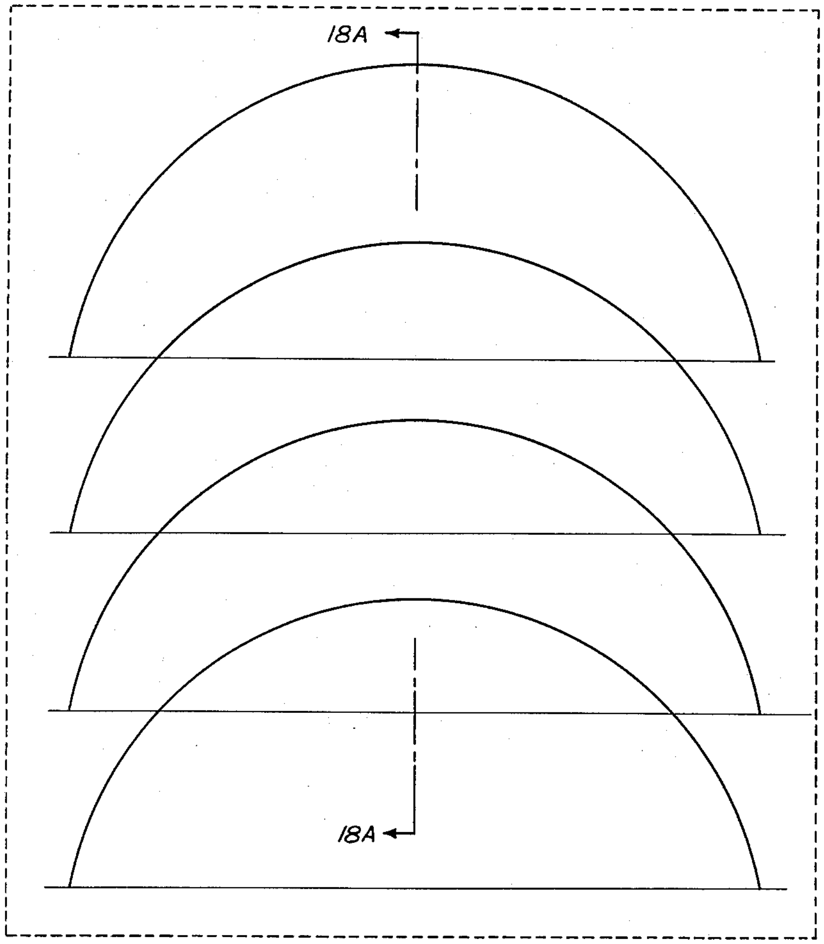
Figure 18 shows schematically a novel multiple source-multiple receiver arrangement, for a magnetic mass separator.
Figure 18A:
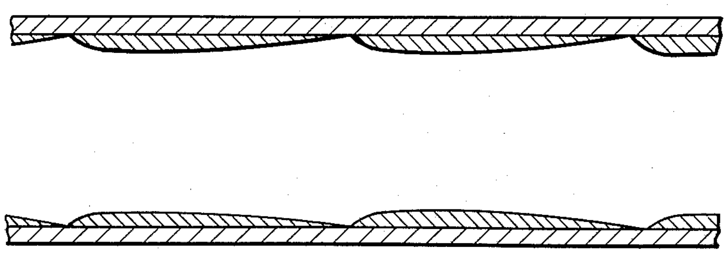
Figure 18A shows in cross section a portion of a periodic shim employed in a multiple source device of the type schematically shown in Figure 18, the section being taken on a vertical plane at the line 18A—18A in Figure 18.

The further advantage of a linear shim designated as a periodic shim for use in a mass spectro-separator in which the sources extend along the $y$ axis rather than the $x$ axis, is shown in Figures 18 and 18A. The schematic representation in Figure 18 of a tank in which the sources and receivers are linear in the $y$ direction indicates the periodic positioning of the beam paths. Shims designed to permit control over the determination of the successive beams at the sources is shown in cross section in Figure 18A and is seen to follow a predetermined periodic curve, that is, the shim surface is in effect a cylindrical section following a plurality of connected curves having portions substantially similar in contour to the linear shim described above.

While specific details of shims constructed pursuant to the principles hereinbefore set forth have been described it is not intended that the scope of the invention be limited thereto. It is obvious that the fabrication and placement of the magnetic bodies shaped to produce an inhomogeneous field of a predetermined distribution between two magnetic poles and on the inside of a tank as described in connection with a magnetic mass separator should not be a limiting factor. A device of the same class can readily be designed by one skilled in the art, in which the pole pieces themselves are contoured in a predetermined manner and that focusing or defocusing of an ion beam passing therebetween can readily be accomplished by enlarging or constricting in this manner, the region travelled by the beam or otherwise deforming the magnetic field. Such enlargements or constrictions may be in the form of the spot shimming or linear shimming, the broad considerations being the determination of the most effective beam image or pattern obtainable at the receiver for the purposes desired (that is, its shape, position and dimensions), and determining from this, the inhomogeneities necessary to produce such an image. The provision of such an inhomogeneous magnetic field by the use of properly shaped pole pieces or magnetic materials therebetween may be readily carried out in many ways.

What has been presented is seen to include a novel method of producing a focused beam image of reduced width at the target zone by employing, in connection with mass spectro-separating devices of the class described, magnetic means to distort the magnetic field. The word "shim" is defined then, as a contoured magnetic surface to produce magnetic field inhomogeneities of a predetermined nature.

Furthermore, the combination of various types of shim may be beneficial in specific cases not discussed in detail hereinabove. For example, a defocusing shim can be readily used in conjunction with a linear shim to produce desired changes in the determination at the target or receiver. It is therefore apparent that while a detailed description has been made herein of certain embodiments of the novel principles expressed, that many other and widely different embodiments are possible and no limitation should be placed hereon except as they may appear in the appended claims.

What is claimed is:

1. An improved ionic mass separator comprising an ion source projecting ions therefrom in a beam having an angular divergence, means establishing a magnetic field normal to the direction of projection of said ion beam and constraining said beam to traverse a semi-circular orbit, an ion receiver disposed on a source-receiver line at a distance from said ion source, and linear magnetic shims formed of ferromagnetic material disposed on opposite sides of said ion beam parallel to said source-receiver line and having mutually presented convex cylindrical surfaces with the minimum separation thereof being disposed adjacent the maximum separation of said beam orbit from the source-receiver line for intensifying the magnetic field over a part of the traverse of said ion beam to focus same at said ion receiver.

2. An improved ionic mass separator comprising means establishing a homogeneous magnetic field, means projecting a beam of ions into said magnetic field transverse thereto whereby said ion beam traverses a curved orbit, a first pair of magnetic shims being disposed within and aligned along said magnetic field with one on each side of said ion beam and having mutually presented concave surfaces defining a region of divergent magnetic field intercepting said ion beam orbit adjacent its origin, a second pair of magnetic shims disposed one on each side of said ion displaced along said magnetic field and beam within said magnetic field and having mutually presented convex surfaces defining a region of converging magnetic field intercepting said ion beam orbit at substantially 90 degrees of its arc, and a third pair of magnetic shims having mutually presented convex surfaces disposed on opposite sides of said ion beam and aligned along said field for defining a region of converging magnetic field intersecting said ion beam orbit at substantially 135 degrees of arc thereof whereby ions of the same mass-to-charge ratio are focused at 180 degrees of arc of said ion beam orbit despite a wide angle of divergence of said ion beam at its origin.

3. An improved mass separator comprising an ion receiver, an ion transmitter spaced from said receiver along a transmitter-receiver line and adapted to transmit a beam of ions in a plane through said transmitter and receiver, means establishing a homogeneous field perpendicular to the plane of said ion beam for curving said beam into an arcuate orbit terminating at said ion receiver, and a pair of linear magnetic shims disposed on opposite sides of said ion beam plane parallel to the transmitter-receiver line, said shims having like mutually presented convex cylindrical surfaces generated by a line moving parallel to the transmitter-receiver line and the lines of closest proximity of said shim surfaces being spaced substantially one half the distance between said ion transmitter and ion receiver from the transmitter-receiver line whereby said ion beam is focused at said ion receiver.

4. An improved electromagnetic mass separator comprising an ion source, an ion receiver spaced from said source along a source receiver line, an evacuated chamber enclosing said source and receiver, means establishing a magnetic field through said chamber perpendicular to a plane through said source-receiver line, ion accelerating means adjacent said ion source for accelerating ions therefrom in an ion beam substantially in said plane perpendicular to the magnetic field whereby said ion beam is curved by said field to traverse a substantially semicircular orbit between said ion source and receiver, and magnetic shims formed of material having a high magnetic permeability disposed within said magnetic field to distort same, said shims being disposed on opposite sides of the plane of said ion beam orbit and having mutually presented cylindrical surfaces of limited area aligned along said magnetic field on opposite sides of said ion beam for distorting the magnetic field through which said beam travels to minimize the ion beam cross section.

5. An improved electromagnetic mass separator as claimed in claim 4 further defined by said magnetic shims comprising three pairs of shims with the first of said pairs being disposed at substantially forty-five degrees of said ion beam orbit and having mutually presented concave surfaces to limitedly defocus said ion beam, the second pair of said shims being disposed at ninety degrees of said ion beam orbit and having mutually presented convex surfaces for refocusing said ion beam, and the third pair of said shims being disposed at one hundred and thirty-five degrees of said ion beam orbit and having mutually presented convex surfaces for further focusing said ion beam whereby the size of the focus of said ion beam at said ion receiver is minimized.

6. An improved mass separator comprising an ion source, an ion receiver spaced from said ion source along a source-receiver line, ion accelerating means adjacent said source for transmitting a high intensity ion beam therefrom in a plane passing through said source-receiver line and with an angular divergence in said plane, means establishing a magnetic field between said source and receiver perpendicular to the plane of said ion beam whereby said ion beam is curved to traverse a semicircular orbit with ions of zero angular divergence focused at said receiver, and a pair of rectangular plates formed of material having a high magnetic permeability disposed parallel to and on opposite sides of the plane of said ion beam, said plates being parallel to and displaced from said source-receiver line and said plates having like mutually presented convex cylindrical surfaces parallel to said source-receiver line with the line of minimum separation thereof tangent to the orbit of the portion of said ion beam having zero angular divergence whereby substantially all ions of the same mass-to-charge ratio are focused at said receiver regardless of initial angular divergence.

References Cited in the file of this patent

UNITED STATES PATENTS

| | | |
|---|---|---|
| 681,835 | Soldana | Sept. 3, 1901 |
| 1,121,859 | Messiter | Dec. 22, 1914 |
| 2,259,531 | Miller et al. | Oct. 21, 1941 |
| 2,471,935 | Coggeshall et al. | May 31, 1949 |

FOREIGN PATENTS

| | | |
|---|---|---|
| 414,967 | Great Britain | Aug. 16, 1934 |
| 513,302 | Great Britain | Dec. 17, 1937 |